US012748038B2

(12) United States Patent
Sawada

(10) Patent No.: US 12,748,038 B2
(45) Date of Patent: Sep. 29, 2026

(54) OPTICAL SYSTEMS AND OPTICAL MEASURING APPARATUS

(71) Applicant: Yokogawa Electric Corporation, Tokyo (JP)

(72) Inventor: Takeshi Sawada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 137 days.

(21) Appl. No.: 18/752,766

(22) Filed: Jun. 24, 2024

(65) Prior Publication Data

US 2025/0027874 A1 Jan. 23, 2025

(30) Foreign Application Priority Data

Jul. 21, 2023 (JP) ................................ 2023-118973

(51) Int. Cl.
*G01N 21/21* (2006.01)
*G01N 21/85* (2006.01)

(52) U.S. Cl.
CPC ............ *G01N 21/21* (2013.01); *G01N 21/85* (2013.01); *G01N 2201/0636* (2013.01)

(58) Field of Classification Search
CPC .................. G01N 21/21; G01N 21/85; G01N 2201/0636; G01N 21/031; G01N 21/0303; G01N 21/05; G01N 2201/0668
USPC .................................................... 356/364
See application file for complete search history.

(56) References Cited

U.S. PATENT DOCUMENTS 4,756,622 A 7/1988 Wong
5,815,258 A 9/1998 Nakanishi
9,546,905 B1 1/2017 Han
2012/0105859 A1* 5/2012 Heo ...................... G01B 11/24 356/456
2017/0082490 A1 3/2017 Hoke
2017/0301288 A1* 10/2017 Perdices-Gonzalez ...................... G09G 3/3208
2018/0073993 A1* 3/2018 Zhao ..................... G06T 7/0004
2018/0114306 A1* 4/2018 Ogawa .................. G02B 27/10
2021/0156790 A1* 5/2021 Hidaka .................... G01J 9/02
2022/0011092 A1* 1/2022 Morino ............. G02B 21/0016
(Continued)

FOREIGN PATENT DOCUMENTS

CN 102239437 B * 4/2015 ......... G02B 26/0833
CN 108732130 A 11/2018
(Continued)

OTHER PUBLICATIONS

Extended European Search Report for counterpart European Application No. 24184949.6, issued by the European Patent Office on Jan. 2, 2025.

*Primary Examiner* — Md M Rahman

(57) ABSTRACT

Provided is an optical system including: a first linear polarizer of a reflection type which receives linearly polarized light transmitted through a sample; and a switching unit which controls a polarization direction of the first linear polarizer, to switch between causing the linearly polarized light received by the first linear polarizer to be transmitted and reflected, where the number of times that light transmitted through the first linear polarizer is transmitted through the sample before reaching an optical receiver is different from the number of times that light reflected by the first linear polarizer is transmitted through the sample before reaching the optical receiver.

18 Claims, 10 Drawing Sheets

(56) References Cited

U.S. PATENT DOCUMENTS

| | | | | |
|---|---|---|---|---|
| 2022/0021473 A1* | 1/2022 | Dong | H01P 3/10 | |
| 2022/0120688 A1* | 4/2022 | Tuunanen | G01N 21/6456 | |
| 2022/0291140 A1* | 9/2022 | Honda | G01N 21/9501 | |
| 2023/0021677 A1* | 1/2023 | Ashimine | G06F 3/042 | |
| 2023/0112997 A1* | 4/2023 | Xu | H04B 7/063 | 370/329 |
| 2023/0175982 A1* | 6/2023 | Honda | G01N 21/9505 | 356/446 |
| 2024/0133824 A1* | 4/2024 | Urano | G01N 21/93 | |

FOREIGN PATENT DOCUMENTS

| | | | | |
|---|---|---|---|---|
| JP | H09218149 A | 8/1997 | | |
| JP | 2005091093 A | 4/2005 | | |
| JP | 2009180665 A | 8/2009 | | |
| JP | 4832187 B2 * | 12/2011 | H04N 13/337 | |

* cited by examiner

OPTICAL SYSTEMS AND OPTICAL MEASURING APPARATUS

The contents of the following patent application(s) are incorporated herein by reference: NO. 2023-118973 filed in JP on Jul. 21, 2023

BACKGROUND

1. Technical Field

The present invention relates to an optical system and an optical measuring apparatus.

2. Related Art

Patent Documents 1 to 3 describe "in an optical path-length variable cell 1, an optical path length can be adjusted to an optimal optical path length by forming, on a protection member 20*a* into which a transmission member 20*b* is charged, a male screw part for position adjustment 23 for adjusting the optical path length to an optical path length being based on a sample M as a measurement target, and by moving the protection member 20*a* in a predetermined direction to perform position adjustment based on the sample M to be measured" (Paragraph 0032, Cited Document 1) and the like.

PRIOR ART DOCUMENT

Patent Document

Patent Document 1: Japanese Patent Application Publication No. 2009-180665
Patent Document 2: Japanese Patent Application Publication No. H9-218149
Patent Document 3: Japanese Patent Application Publication No. 2005-91093

DESCRIPTION OF EXEMPLARY EMBODIMENTS

Hereinafter, embodiments of the present invention will be described. However, the following embodiments are not for limiting the invention according to the claims. In addition, not all combinations of features described in the embodiment are essential to the solution of the invention.

First Embodiment (Configuration of Optical Measuring Apparatus 1)

Figure 1:
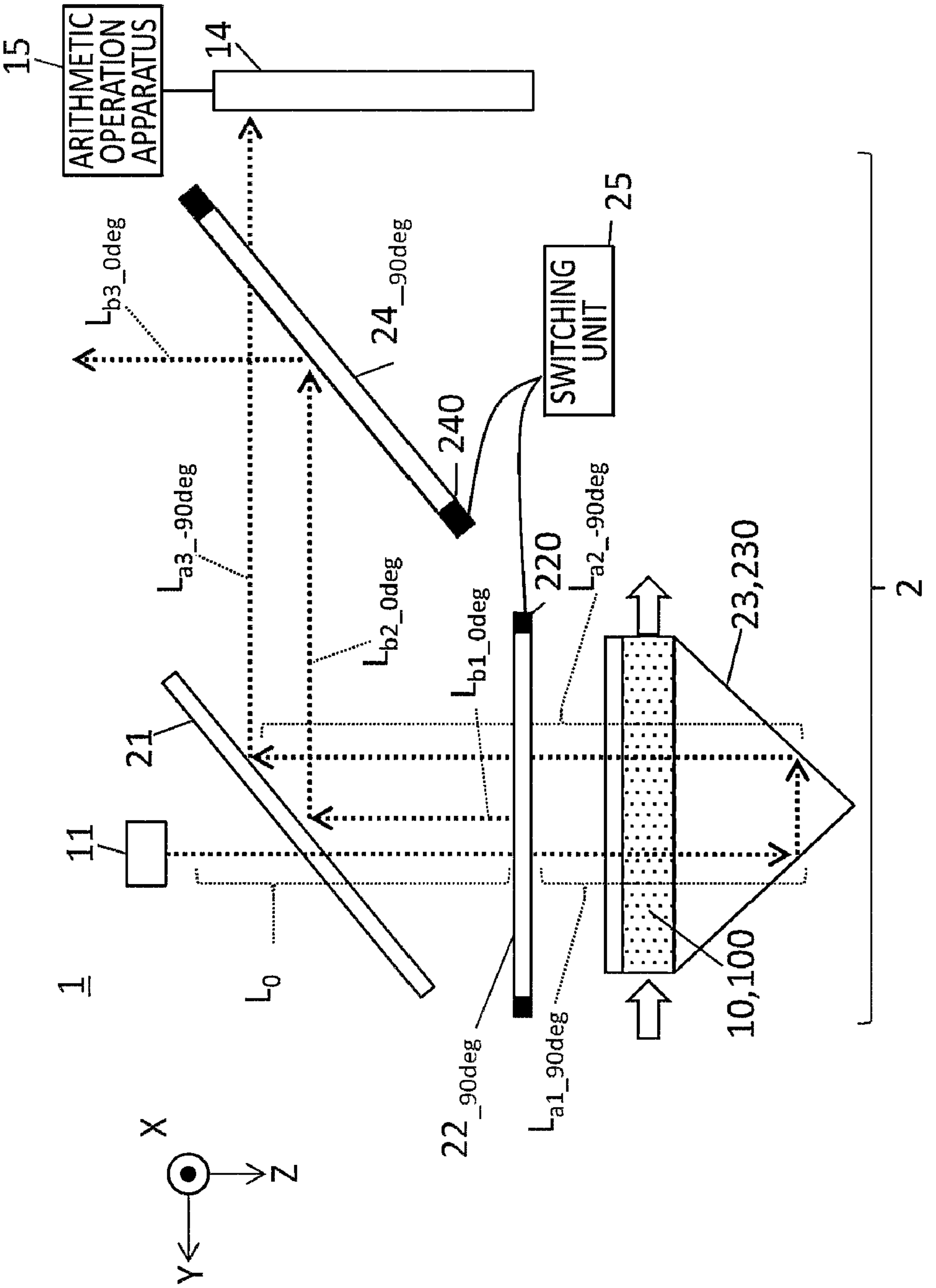
FIG. 1 shows an optical measuring apparatus 1 according to the present embodiment.

FIG. 1 shows an optical measuring apparatus 1 according to the present embodiment. The optical measuring apparatus 1 includes a flow cell 10, a light source 11, an optical system 2, an optical receiver 14, and an arithmetic operation apparatus 15. It should be noted that, in the figure, the X axis direction is a direction from the back surface side toward the front surface side of the drawing sheet, the Y axis direction is a direction from the right side toward the left side in the figure, and the Z axis direction is a direction from the top side toward the bottom side in the figure. The X axis direction, the Y axis direction, and the Z axis direction may be orthogonal to each other.

((Flow Cell 10))

The flow cell 10 may be a hollow member which contains a sample 100 therein. In the present embodiment, as an example, the flow cell 10 may allow the sample 100 to flow therein, and at least part of a region through which the optical system 2 allows light to pass may have translucency. The sample 100 may be a fluid flowing in the flow cell 10, and it may be a liquid or a gas. The flow cell 10 may be connected to a flow synthesizing apparatus (not illustrated) which mixes a plurality of components and allows the mixture to flow through the flow cell 10 as the sample 100.

((Light Source 11))

The light source 11 emits light to the optical system 2. The light source 11 may emit nonpolarized light in the Z axis direction. The light emitted from the light source 11 may be any of ultraviolet light, visible light, near-infrared light, infrared light, and terahertz light, or may be light of another wavelength. The light source 11 may be, as an example, a laser light source such as an Ar laser, or may be an LED, a tungsten lamp, or the like.

((Optical System 2))

The optical system 2 allows the light from the light source 11 to pass through the sample 100, to guide the light to the optical receiver 14. The optical system 2 according to the present embodiment may cause the light to enter the sample 100 perpendicularly, and may cause the light to enter the sample 100 perpendicularly each time it allows the light to pass through the sample 100. The optical system 2 has a half mirror 21, a linear polarizer 22, a reflection member 23, a linear polarizer 24, and a switching unit 25. Among these, the half mirror 21, the linear polarizer 22, and the reflection member 23 are arranged side by side in the Z axis direction together with the light source 11. In addition, the half mirror 21 and the linear polarizer 24 are arranged side by side in the Y axis direction together with the optical receiver 14 which will be described later.

(((Half Mirror 21)))

The half mirror 21 transmits part of the light which has been received, and reflects another part thereof. The half mirror 21 may transmit part of the light emitted from the light source 11, and cause it to enter the linear polarizer 22. The half mirror 21 may reflect, toward the linear polarizer 24, part of the light travelling from the linear polarizer 22 toward the light source 11. The half mirror 21 may be arranged so as to be tilted with respect to an optical axis between the light source 11 and the reflection member 23, and in the present embodiment, as an example, it may be arranged at 45 degrees to the Z axis direction.

(((Linear Polarizer 22)))

The linear polarizer 22 is an example of a first linear polarizer. The linear polarizer 22 may be arranged so as to face the reflection member 23 with the sample 100 interposed therebetween, and in the present embodiment, as an example, it may be arranged so as to face the reflection member 23 with the flow cell 10 containing the sample 100 interposed therebetween. The linear polarizer 22 may be arranged so as to be orthogonal to the optical axis between the light source 11 and the reflection member 23. The linear polarizer 22 may be arranged apart from the flow cell 10, or may be arranged in contact with the flow cell 10.

The linear polarizer 22 may be a polarizer of a reflection type, and may have a transmission axis as a polarization direction of light to be transmitted and a reflection axis as a polarization direction of light to be reflected. A transmission axis and a reflection axis of the linear polarizer 22 may intersect with each other, and in the present embodiment, as an example, they are orthogonal to each other. It should be noted that, in the present embodiment, as an example, the linear polarizer 22 may be a wire grid polarizer, and may be configured by sandwiching a plurality of metal wires arranged so as to be parallel to each other between transparent substrates made of glass or the like. A transmission axis of the wire grid polarizer may be perpendicular to a direction in which the wires extend, and may be parallel to a direction in which the wires are arrayed. A reflection axis of the wire grid polarizer may be parallel to the direction in which the wires extend.

The linear polarizer 22 may transmit linearly polarized light with a transmission axis direction of the linear polarizer 22 as its polarization direction (that is, linearly polarized light which vibrates in the transmission axis direction) out of the light emitted from the light source 11, cause it to be transmitted through the sample 100, and cause it to enter the reflection member 23. The linear polarizer 22 may reflect linearly polarized light with a reflection axis direction as its polarization direction out of the light emitted from the light source 11, and cause it to enter the half mirror 21.

The linear polarizer 22 may receive the linearly polarized light transmitted through the sample 100, and in the present embodiment, as an example, it may receive light reflected by the reflection member 23 and transmitted through the sample 100. Although details will be described later, depending on a polarization direction of light transmitted through the linear polarizer 22 and reflected by the reflection member 23, the linear polarizer 22 may reflect or transmit that light.

The linear polarizer 22 may be held by a holding member 220. The holding member 220 may hold the linear polarizer 22 such that the linear polarizer 22 can rotate while maintaining its orientation. Rotating the linear polarizer 22 while maintaining its orientation may mean rotating the linear polarizer 22 without changing orientation of an optical surface of the linear polarizer 22.

(((Reflection Member 23)))

The reflection member 23 reflects, in an opposite direction, the linearly polarized light transmitted through the sample 100 and entering the reflection member 23, causes it to be further transmitted through the sample 100, and causes it to enter the linear polarizer 22. In the present embodiment, as an example, the reflection member 23 may receive light travelling straight in the positive Z axis direction, and reflect that light in the negative Z axis direction.

The reflection member 23 may reverse a polarization direction of light emitted from that reflection member 23 in at least one direction orthogonal to an optical axis direction (in the present embodiment, as an example, the Z axis direction) with respect to a polarization direction of light entering that reflection member 23. For example, the reflection member 23 may reverse a polarization direction of outgoing light in one direction (in the present embodiment, as an example, the Y axis direction) orthogonal to the optical axis direction with respect to a polarization direction of incident light, and maintain it in a reference axis direction (in the present embodiment, as an example, the X axis direction) orthogonal to the optical axis direction and that one direction.

The reflection member 23 may have at least one roof mirror 230 which reflects the incident light two times and emits it in the opposite direction, and in the present embodiment, as an example, it has a single roof mirror 230. The roof mirror 230 may be formed with its two reflection planes facing each other over the reference axis direction (in the present embodiment, as an example, the X axis direction) so as to have an internal angle of 90 degrees. The two reflection planes may be in contact with each other over the reference axis direction. In the present embodiment, as an example, the roof mirror 230 may be a right-angle prism, but it may be formed with its two plane mirrors being in contact with each other. The roof mirror 230 may be arranged apart from the flow cell 10, may be arranged in contact with the flow cell 10, or may be part of a window member of the flow cell 10.

(((Linear Polarizer 24)))

The linear polarizer 24 is an example of a second linear polarizer, and is arranged on an optical path between the half mirror 21 and the optical receiver 14. The linear polarizer 24 may be of either an absorption type or the reflection type, but in the present embodiment, as an example, it is of the reflection type, and has a transmission axis and a reflection axis. The transmission axis and the reflection axis of the linear polarizer 24 may intersect with each other, and in the present embodiment, as an example, they are orthogonal to each other. It should be noted that, in the present embodiment, as an example, the linear polarizer 24 may be a wire grid polarizer.

The linear polarizer 24 may be arranged so as to be tilted with respect to an optical axis between the half mirror 21 and the optical receiver 14, and in the present embodiment, as an example, it may be arranged at 45 degrees to the Y axis direction. Although details will be described later, depending on a polarization direction of light emitted from the half mirror 21 toward the optical receiver 14, the linear polarizer 24 may reflect and remove that light, or may transmit that light and cause it to enter the optical receiver 14.

The linear polarizer 24 may be held by a holding member 240. The holding member 240 may hold the linear polarizer 24 such that the linear polarizer 24 can rotate while maintaining its orientation.

(((Switching Unit 25)))

The switching unit 25 controls a polarization direction of the linear polarizer 22, to switch between causing the linearly polarized light received by the linear polarizer 22 to be transmitted and reflected. As a result, an optical path of outgoing light from the linear polarizer 22 may be switched between an optical path toward the optical receiver 14 and an optical path on which the light is further transmitted through the sample 100 and then travels toward the optical receiver 14. In other words, the number of times that the light transmitted through the linear polarizer 22 is transmitted through the sample 100 before reaching the optical receiver 14 may be different from the number of times that the light reflected by the linear polarizer 22 is transmitted through the sample 100 before reaching the optical receiver 14.

The switching unit 25 may control the polarization direction by rotating the linear polarizer 22 while maintaining its orientation. The switching unit 25 may rotate the linear polarizer 22 via the holding member 220. The switching unit 25 may orient the transmission axis of the linear polarizer 22 in a direction (in the present embodiment, as an example, the Y axis direction) orthogonal to the reference axis direction (in the present embodiment, as an example, the X axis direction) and in a direction at an angle of either ±45 degrees or ±135 degrees to the reference axis direction.

The switching unit 25 may further control a polarization direction of the linear polarizer 24, to switch between causing the linearly polarized light received by the linear polarizer 24 to be transmitted and reflected. The switching unit 25 may rotate the linear polarizer 24 while maintaining its orientation. The switching unit may rotate the linear polarizer 24 via the holding member 240. The switching unit 25 may match an angle at which the transmission axis of the linear polarizer 24 is to the reference axis direction (in the present embodiment, as an example, the X axis direction) with an angle at which the transmission axis of the linear polarizer 22 is to the reference axis direction. As an example, when orienting the transmission axis of the linear polarizer 22 at 45 degrees to the X axis direction, the switching unit 25 may orient the transmission axis of the linear polarizer 24 at 45 degrees to the X axis direction. It should be noted that being at 135 degrees to the X axis direction may be the same as being at −45 degrees to the X axis direction and that being at −135 degrees to the X axis direction may be the same as being at 45 degrees to the X axis direction.

(((Optical Receiver 14)))

The optical receiver 14 receives light emitted from the optical system. The optical receiver 14 may measure intensity or spectrum of light. As an example, the optical receiver 14 may be a photodiode, a phototransistor, or the like. The optical receiver 14 may supply the arithmetic operation apparatus 15 with a signal corresponding to the light which has been received (as an example, a signal indicating the intensity of the light or a signal indicating the spectrum of the light).

(((Arithmetic Operation Apparatus 15)))

The arithmetic operation apparatus 15 calculates a result of measurement or analysis of the sample 100 based on the signal supplied from the optical receiver 14. When the optical measuring apparatus 1 is an absorption photometer, the arithmetic operation apparatus 15 may calculate absorbance or transmittance of the sample 100 by absorption photometry. When the optical measuring apparatus 1 is a spectroscope, the arithmetic operation apparatus 15 may calculate a result of qualitative or quantitative analysis of a component of the sample 100 by spectroscopy. The arithmetic operation apparatus 15 may use a difference between spectra (also referred to as an absorbance difference spectrum) obtained by switching the optical path, to calculate a concentration of the component in the sample 100 or the like by a difference absorption spectrum method.

((Action))

Subsequently, action of the optical system 2 according to the present embodiment will be described. It should be noted that, in the following description, an angle notation such as "90 deg" added to reference numerals such as the linear polarizers 22 and 24 indicates an angle of a transmission axis with respect to the reference axis direction (in the present embodiment, as an example, the X axis direction). In addition, an angle notation such as "90 deg" added to a symbol such as light $L_{a1}$ or $L_{b1}$ indicates an angle of a polarization direction with respect to the reference axis direction.

(((when Transmission Axes of Linear Polarizer 22 and Linear Polarizer 24 are Orthogonal to Reference Axis Direction)))

FIG. 1 shows an optical path for a case where the transmission axes of the linear polarizer 22 and the linear polarizer 24 are oriented in a direction orthogonal to the reference axis direction. When the transmission axes of the linear polarizer 22 and the linear polarizer 24 are orthogonal to the reference axis direction, part of unpolarized light $L_0$ emitted from the light source 11 is transmitted through the half mirror 21, and enters a linear polarizer 22$_{\_90\ deg}$.

A linearly polarized component with a reflection axis direction of the linear polarizer 22$_{\_90\ deg}$ (here, the X axis direction) as its polarization direction out of the unpolarized light $L_0$ which has entered the linear polarizer 22$_{\_90\ deg}$, is reflected by the linear polarizer 22$_{\_90\ deg}$ to become linearly polarized light $L_{b1\_0\ deg}$, and enters the half mirror 21. Part of the linearly polarized light $L_{b1\_0\ deg}$ which has entered the half mirror 21 is reflected to become light $L_{b2\_0\ deg}$, then is further reflected by a linear polarizer 24$_{\_90\ deg}$ to become light $L_{b3\_0\ deg}$, and is removed.

On the other hand, a linearly polarized component with a transmission axis direction of the linear polarizer 22$_{\_90\ deg}$ (here, the Y axis direction) as its polarization direction out of the unpolarized light $L_0$ which has entered the linear polarizer 22$_{\_90\ deg}$, is transmitted through the linear polarizer 22$_{\_90\ deg}$ to become linearly polarized light $L_{a1\_90\ deg}$, is transmitted through the sample 100 and reflected by the reflection member 23 (in the present embodiment, as an example, the roof mirror 230), and becomes linearly polarized light $La_{2\_-90\ deg}$ with its polarization direction reversed in the Y axis direction. In this manner, when the transmission axis direction of the linear polarizer 22$_{\_90\ deg}$ is orthogonal to the reference axis direction, the linearly polarized light $L_{a1\_90\ deg}$ with the transmission axis direction as its polarization direction enters the roof mirror 230 and is reflected, and the linearly polarized light $L_{a2\_-90\ deg}$ with the transmission axis direction as its polarization direction is emitted from the roof mirror 230. Therefore, the linearly polarized light $La_{2\_-90\ deg}$ emitted from the roof mirror 230 is transmitted through the sample 100 and the linear polarizer 22$_{\_90\ deg}$ and enters the half mirror 21. Then, part of the linearly polarized light $L_{a2\_-90\ deg}$ which has entered the half mirror 21 is reflected to become light $La_{3\_-90\ deg}$, and is transmitted through the linear polarizer 24$_{\_90\ deg}$ and enters the optical receiver 14.

Therefore, when transmission axis directions of the linear polarizers 22 and 24 are orthogonal to the reference axis direction, the light $L_{a2\_-90\ deg}$ entering the linear polarizer 22$_{\_90\ deg}$ from the roof mirror 230 is transmitted through the linear polarizer 22 and guided to the optical path toward the optical receiver 14, and the light emitted from the light source 11 is transmitted through the sample 100 two times in total and enters the optical receiver 14. It should be noted that the movement described above is the same for a case where the transmission axes of the linear polarizers 22 and 24 are at −90 degrees, +270 degrees, 0 degrees, or +180 degrees to the reference axis direction.

(((when Transmission Axes of Linear Polarizer 22 and Linear Polarizer 24 are at Angle of −45 Degrees to Reference Axis Direction)))

Figure 2:
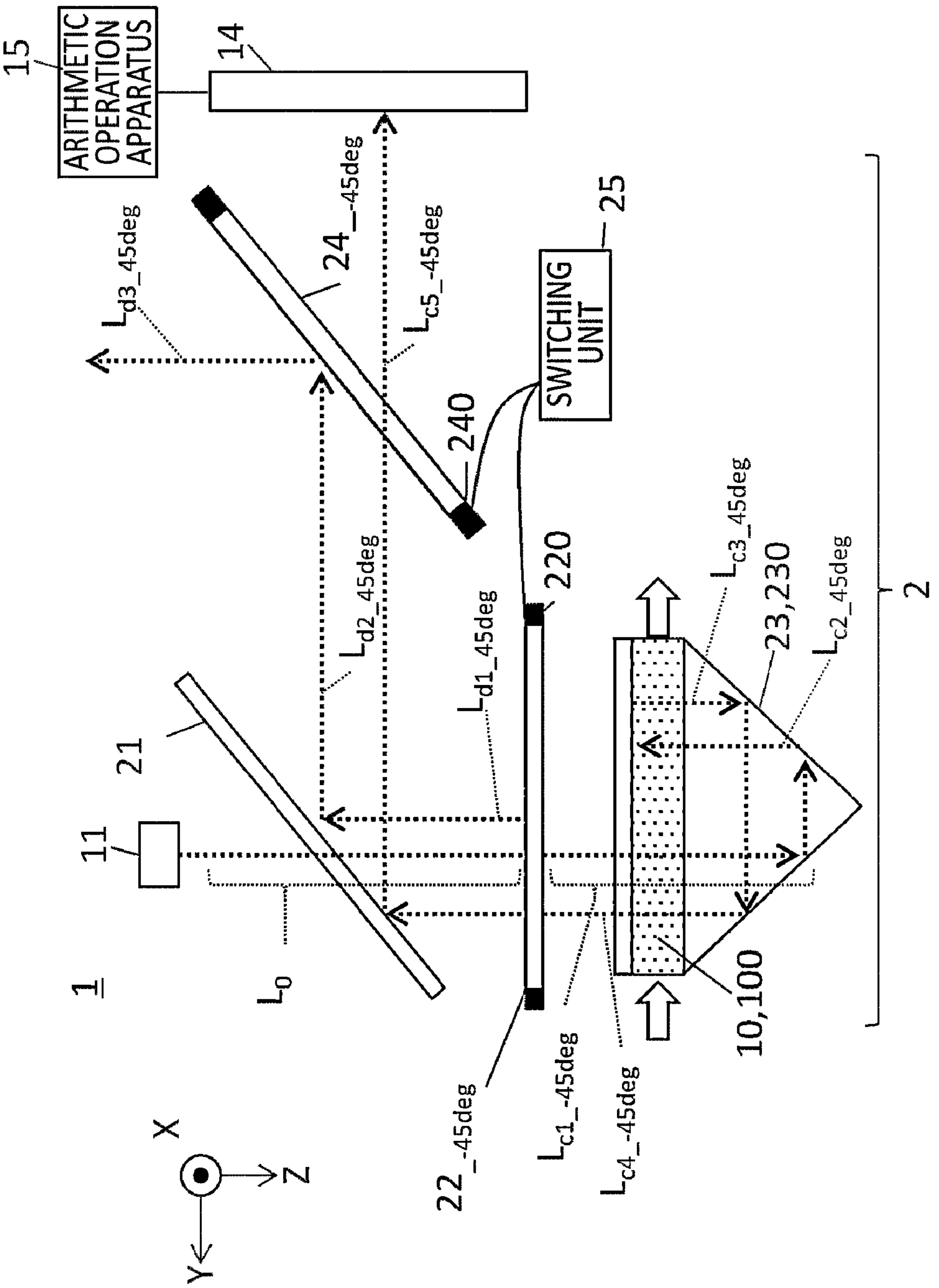
FIG. 2 shows an optical path for a case where transmission axes of a linear polarizer 22 and a linear polarizer 24 are oriented at an angle of −45 degrees to a reference axis direction.

FIG. 2 shows an optical path for a case where the transmission axes of the linear polarizer 22 and the linear polarizer 24 are oriented at −45 degrees to the reference axis direction. When the transmission axes of the linear polarizer 22 and the linear polarizer 24 are at an angle of −45 degrees to the reference axis direction, part of the unpolarized light $L_0$ emitted from the light source 11 is transmitted through the half mirror 21 and enters a linear polarizer $\mathbf{22}_{\_-45\ deg}$.

A linearly polarized component with a reflection axis direction of the linear polarizer $\mathbf{22}_{\_-45\ deg}$ (here, a direction at 45 degrees to the X axis direction) as its polarization direction out of the unpolarized light $L_0$ which has entered the linear polarizer $\mathbf{22}_{\_-45\ deg}$, is reflected by the linear polarizer $\mathbf{22}_{\_-45\ deg}$ to become linearly polarized light $L_{d1\_45\ deg}$, and enters the half mirror 21. Part of the light $L_{d1\_45\ deg}$ which has entered the half mirror 21 is reflected to become linearly polarized light $L_{d2\_45\ deg}$, then is further reflected by a linear polarizer $\mathbf{24}_{\_-45\ deg}$ to become light $L_{d3\_45\ deg}$, and is removed.

On the other hand, a linearly polarized component with a transmission axis direction of the linear polarizer $\mathbf{22}_{\_-45\ deg}$ (here, a direction at −45 degrees to the X axis direction) as its polarization direction out of the unpolarized light $L_0$ which has entered the linear polarizer $\mathbf{22}_{\_-45\ deg}$, is transmitted through the linear polarizer $\mathbf{22}_{\_-45\ deg}$ to become light $L_{c1\_-45\ deg}$, is transmitted through the sample 100 and reflected by the roof mirror 230, and becomes linearly polarized light $L_{c2\_45\ deg}$ with its polarization direction reversed in the Y axis direction. In this manner, when the transmission axis direction of the linear polarizer 22 is at the angle of −45 degrees to the reference axis direction, the polarization direction changes by 90 degrees between before and after reflection by the roof mirror 230. As a result, the linearly polarized light $L_{c1\text{-}45\ deg}$ with the transmission axis direction of the linear polarizer 22 as its polarization direction enters the roof mirror 230 and is reflected, and the linearly polarized light $L_{c2\_45\ deg}$ with a direction perpendicular to the transmission axis direction of the linear polarizer 22, that is, a reflection axis direction of the linear polarizer 22 as its polarization direction, is emitted from the roof mirror 230. Therefore, the linearly polarized light $L_{c2\_45\ deg}$ emitted from the roof mirror 230 is transmitted through the sample 100 and reflected by the linear polarizer $\mathbf{22}_{\_-45\ deg}$ to become linearly polarized light $L_{c3\_45\ deg}$, and then is transmitted through the sample 100 and reflected again by the roof mirror 230.

The linearly polarized light $L_{c3\_45\ deg}$ reflected again by the roof mirror 230 becomes linearly polarized light $L_{c4\_-45\ deg}$ with its polarization direction reversed in the Y axis direction, and the polarization direction changes by 90 degrees before and after the reflection by the roof mirror 230. As a result, the linearly polarized light $L_{c3\_45\ deg}$ with the reflection axis direction of the linear polarizer 22 as its polarization direction enters the roof mirror 230 and is reflected, and the linearly polarized light $L_{c4\_-45\ deg}$ with the transmission axis direction of the linear polarizer 22 as its polarization direction is emitted from the roof mirror 230. Therefore, the linearly polarized light $L_{c4\_-45\ deg}$ emitted from the roof mirror 230 is transmitted through the sample 100 and the linear polarizer $\mathbf{22}_{\_-45\ deg}$ and enters the half mirror 21. Then, part of the linearly polarized light $L_{c4\_-45\ deg}$ which has entered the half mirror 21 is reflected to become light $L_{c5\_-45\ deg}$, and is transmitted through the linear polarizer $\mathbf{24}_{\_-45\ deg}$ and enters the optical receiver 14.

Therefore, when the transmission axes of the linear polarizers 22 and 24 are at −45 degrees to the reference axis direction, the light $L_{c2\_45\ deg}$ entering the linear polarizer $\mathbf{22}_{\_-45\ deg}$ from the reflection member 23 is reflected by the linear polarizer 22, transmitted again through the sample 100, and reflected by the reflection member 23, and is guided to an optical path of light entering the linear polarizer $\mathbf{22}_{\_-45\ deg}$, and the light emitted from the light source 11 is transmitted through the sample 100 four times in total and enters the optical receiver 14. It should be noted that the movement described above is the same for a case where the transmission axes of the linear polarizer 22 and the linear polarizer 24 are at 45 degrees, 135 degrees, or −135 degrees to the reference axis direction.

According to the optical measuring apparatus 1 described above, the polarization direction of the linear polarizer 22 is controlled, and switching is performed between causing the linearly polarized light received by the linear polarizer 22 to be transmitted and reflected. Then, the number of times that the light transmitted through the linear polarizer 22 is transmitted through the sample 100 before reaching the optical receiver 14 is different from the number of times that the light reflected by the linear polarizer 22 is transmitted through the sample 100 before reaching the optical receiver 14. Therefore, it is possible to switch a length of an optical path passing through the sample 100 by controlling the polarization direction of the linear polarizer 22. Therefore, unlike a case where a thickness of the flow cell 10 is changed to change a thickness of the sample 100, it is possible to switch the length of the optical path passing through the sample 100 while preventing a change in pressure applied to the sample 100.

In addition, the reflection member 23 which reflects the linearly polarized light and causes it to enter the linear polarizer 22 reverses a polarization direction of the outgoing light in at least one direction orthogonal to the optical axis direction with respect to a polarization direction of the incident light. Therefore, the polarization direction can be controlled to be a predetermined direction by reflecting the light with the reflection member 23. In addition, since the linearly polarized light is transmitted through the sample 100 before and after the reflection by the reflection member 23, the length of the optical path in the sample 100 can be increased.

In addition, since the reflection member 23 is equipped with at least one roof mirror 230 which reflects the incident light two times and emits it in the opposite direction, a simple configuration can reverse the polarization direction of the outgoing light with respect to the polarization direction of the incident light on the reflection member 23.

In addition, the linear polarizer 22 is arranged so as to face the reflection member 23 with the sample 100 interposed therebetween, transmits the linearly polarized light with the transmission axis direction as its polarization direction out of the outgoing light from the light source 11, and causes it to enter the reflection member 23 via the sample 100, and also receives light reflected by that reflection member 23 and transmitted through the sample 100. Therefore, it is possible to switch, by controlling the polarization direction of the linear polarizer 22, between guiding the light entering the linear polarizer 22 from the reflection member 23 to an optical path on which the light is transmitted through the linear polarizer 22 and travels toward the optical receiver 14 and to an optical path on which the light is reflected by the linear polarizer 22, transmitted again through the sample 100, and reflected by the reflection member 23, and enters the linear polarizer 22.

In addition, the transmission axis and the reflection axis of the linear polarizer 22 are orthogonal to each other, and the reflection member 23 reverses the polarization direction of the outgoing light in the Y axis direction orthogonal to the optical axis direction with respect to the polarization direction of the incident light, and maintains it in the X axis direction. In addition, the switching unit 25 rotates the linear polarizer 22 while maintaining orientation of the linear polarizer 22, thereby orienting the transmission axis in the Y axis direction and in a direction at the angle of either ±45 degrees or ±135 degrees to the X axis direction. Therefore, as a result of the transmission axis of the linear polarizer 22 being oriented in the Y axis direction, the light emitted from the light source 11 can be transmitted through the sample 100 two times, then be transmitted through the linear polarizer 22, and enter the optical receiver 14. In addition, as a result of the transmission axis of the linear polarizer 22 being oriented in the direction at the angle of either ±45 degrees or ±135 degrees to the X axis direction, the light emitted from the light source 11 can be transmitted through the sample 100 four times, then be transmitted through the linear polarizer 22, and enter the optical receiver 14. Therefore, it is possible to switch the length of the optical path passing through the sample 100 by rotating the linear polarizer 22.

In addition, the half mirror 21 transmits part of the outgoing light from the light source 11 and causes it to enter the linear polarizer 22, and reflects, toward the optical receiver 14, part of the light travelling from the linear polarizer 22 toward the light source 11, and the switching unit 25 rotates the linear polarizer 24 and matches an angle at which the transmission axis of the linear polarizer 24 is to the reference axis direction with an angle at which the transmission axis of the linear polarizer 22 is to the reference axis direction. Therefore, the linearly polarized light transmitted through the sample 100 and then transmitted through the linear polarizer 22 toward the light source 11 is at least partially reflected by the half mirror 21 and transmitted through the linear polarizer 24, and enters the optical receiver 14. Therefore, it is possible to reliably cause the light transmitted through the sample 100 and the linear polarizer 22 to enter the optical receiver 14.

In addition, since the light enters the sample 100 perpendicularly, it is possible to prevent the optical path from changing depending on a refractive index of the sample 100. Therefore, it is possible to prevent a decrease in accuracy of measurement using the light received by the optical receiver 14.

In addition, since the linear polarizers 22 and 24 are wire grid polarizers, it is possible to reliably cause the linearly polarized light to be reflected and transmitted by rotating the linear polarizers while maintaining their orientations.

In addition, since the optical receiver 14 receives light emitted from the optical system 2, the sample 100 can be measured by analyzing the light which has been received.

In addition, since the sample 100 is a fluid flowing in the flow cell 10 which is translucent, a fluid sample can be measured.

Second Embodiment (Configuration of Optical Measuring Apparatus 1A)

Figure 3:
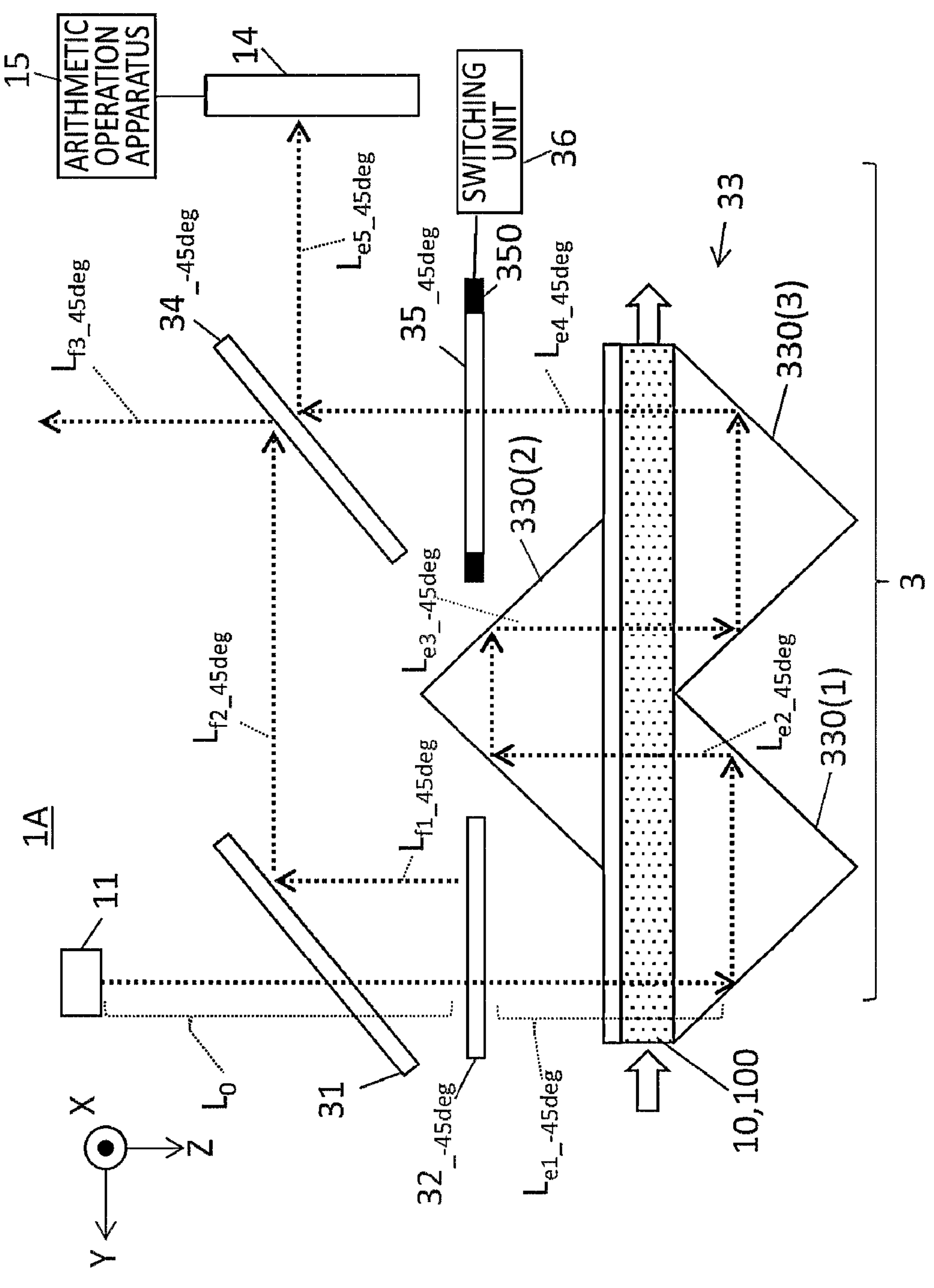
FIG. 3 shows an optical measuring apparatus 1A according to a second embodiment.

FIG. 3 shows an optical measuring apparatus 1A according to a second embodiment. The optical measuring apparatus 1A includes an optical system 3. It should be noted that, in the second embodiment and a third embodiment which will be described later, constituents which are substantially the same as those shown in FIG. 1 are denoted by the same reference numerals, and description thereof will be omitted.

((Optical System 3))

The optical system 3 allows light from a light source 11 to pass through a sample 100, to guide the light to an optical receiver 14. The optical system 3 according to the present embodiment may cause the light to enter the sample 100 perpendicularly. The optical system 3 has a half mirror 31, a linear polarizer 32, a reflection member 33, linear polarizers 34 and 35, and a switching unit 36. Among these, the half mirror 31, the linear polarizer 32, and part of the reflection member 33 are arranged side by side in the Z axis direction together with the light source 11, and another part of the reflection member 33 and the linear polarizers 34 and 35 are arranged side by side in the Z axis direction so as to be parallel to the half mirror 31, the linear polarizer 32, and the part of the reflection member 33. In addition, the half mirror 31 and the linear polarizer 34 are arranged side by side in the Y axis direction together with the optical receiver 14.

(((Half Mirror 31)))

The half mirror 31 transmits part of the light which has been received, and reflects another part thereof. The half mirror 31 may transmit part of the light emitted from the light source 11, and cause it to enter the linear polarizer 32. The half mirror 31 may reflect, toward the linear polarizer 34, part of light travelling from the linear polarizer 32 toward the light source 11. The half mirror 31 may be arranged so as to be tilted with respect to an optical axis between the light source 11 and the reflection member 33, and in the present embodiment, as an example, it may be arranged at 45 degrees to the Z axis direction.

(((Linear Polarizer 32)))

The linear polarizer 32 is an example of a third linear polarizer, and is arranged on an optical path between the light source 11 and the reflection member 33. The linear polarizer 32 may be arranged so as to face part of the reflection member 33 with the sample 100 interposed therebetween, and in the present embodiment, as an example, it may be arranged so as to face a roof mirror 330 (1) (which will be described later) in the reflection member 33 with the flow cell 10 containing the sample 100 interposed therebetween. The linear polarizer 32 may be arranged so as to be orthogonal to the optical axis between the light source 11 and the reflection member 33. The linear polarizer 32 may be arranged apart from the flow cell 10, or may be arranged in contact with the flow cell 10.

The linear polarizer 32 may be of either an absorption type or a reflection type, but in the present embodiment, as an example, it is of the reflection type, and has a transmission axis and a reflection axis. The transmission axis and the reflection axis of the linear polarizer 32 may intersect with each other, and in the present embodiment, as an example, they are orthogonal to each other. It should be noted that, in the present embodiment, as an example, the linear polarizer 32 may be a wire grid polarizer.

The transmission axis of the linear polarizer 32 may be fixed, and is at an angle θ (in the present embodiment, as an example, −45 degrees), which is an angle other than 90 degrees, to a reference axis direction (in the present embodiment, as an example, the X axis direction). The angle θ may be an angle of either ±45 degrees or ±135 degrees, and in the present embodiment, as an example, it is-45 degrees.

The linear polarizer 32 may transmit the linearly polarized light with a transmission axis direction (in the present embodiment, as an example, a direction at −45 degrees to the X axis direction) as its polarization direction out of the light emitted from the light source 11, and cause it to be transmitted through the sample 100 and to enter the reflection member 33. The linear polarizer 32 may reflect linearly polarized light with a reflection axis direction (in the present embodiment, as an example, a direction at 45 degrees to the X axis direction) as its polarization direction out of the light emitted from the light source 11, and cause it to enter the half mirror 31.

The linear polarizer 32 may receive the linearly polarized light transmitted through the sample 100, and in the present embodiment, as an example, it may receive the linearly polarized light which is reflected by the linear polarizer 35 and transmitted through the sample 100 and which is further reflected by the reflection member 33 and transmitted through the sample 100. Although details will be described later, that linearly polarized light may be transmitted through the linear polarizer 32 because its polarization direction is the transmission axis direction of the linear polarizer 32.

(((Reflection Member 33)))

The reflection member 33 reflects, in an opposite direction, the linearly polarized light transmitted through the sample 100 and entering the reflection member 33 and causes it to be further transmitted through the sample 100, and causes it to enter the linear polarizer 35. In the present embodiment, as an example, the reflection member 33 may receive light in the positive Z axis direction, and reflect that light in the negative Z axis direction.

Similarly to the reflection member 23 in the first embodiment described above, the reflection member 33 may reverse a polarization direction of light emitted from that reflection member 33 in at least one direction orthogonal to an optical axis direction (in the present embodiment, as an example, the Z axis direction) with respect to a polarization direction of the light entering that reflection member 33. For example, the reflection member 33 may reverse a polarization direction of outgoing light in one direction (in the present embodiment, as an example, the Y axis direction) orthogonal to the optical axis direction with respect to a polarization direction of incident light, and maintain it in the reference axis direction (in the present embodiment, as an example, the X axis direction) orthogonal to the optical axis direction and that one direction.

The reflection member 33 may have at least one roof mirror 330 which reflects the incident light two times and emits it in the opposite direction, and may have, for example, n roof mirrors 330 consisting of a first roof mirror 330 to an nth roof mirror 330 (where n is an odd number equal to or greater than 3) provided in order on the optical path. Among these, each of the first roof mirror 330 to the (n−1)th roof mirror 330 may return the light transmitted through the sample 100 and cause it to be transmitted through that sample 100 and to enter a next roof mirror 330 on the optical path, and the nth roof mirror 330 may cause emitted light to be transmitted through the sample 100 and to enter the linear polarizer 35.

In the present embodiment, as an example, the reflection member 33 has a first roof mirror 330 to a third roof mirror 330 (also referred to as the roof mirror 330 (1) to a roof mirror 330 (3)). Among these, the first roof mirror 330 (1) and the third roof mirror 330 (3) as odd-numbered roof mirrors may be arranged on a side opposite to the light source 11 with respect to the flow cell 10, and may face the linear polarizers 32 and 35 with the sample 100 interposed therebetween. The second roof mirror 330 (2) as an even-numbered roof mirror may be arranged on a side of the light source 11 with respect to the flow cell 10. Then, the light which has been emitted from the linear polarizer 32 and entered the first roof mirror 330 (1) may be emitted from the third roof mirror 330 (3) and enter the linear polarizer 35, and the light which has been emitted from the linear polarizer 35 and entered the third roof mirror 330 (3) may be emitted from the first roof mirror 330 (1) and enter the linear polarizer 32. Similarly to the roof mirror 230 in the first embodiment, each roof mirror 330 may be formed with its two reflection planes facing each other over the reference axis direction (in the present embodiment, as an example, the X axis direction) so as to have an internal angle of 90 degrees. Each roof mirror 330 may be arranged apart from the flow cell 10, may be arranged in contact with the flow cell 10, or may be part of a window member of the flow cell 10.

(((Linear Polarizer 34)))

The linear polarizer 34 is an example of a fourth linear polarizer, and is arranged on an optical path between the half mirror 31 and the optical receiver 14 and on an optical path between the linear polarizer 35 and the optical receiver 14. The linear polarizer 34 may be a polarizer of the reflection type, and has a transmission axis and a reflection axis. The transmission axis and the reflection axis of the linear polarizer 34 may intersect with each other, and in the present embodiment, as an example, they are orthogonal to each other. It should be noted that, in the present embodiment, as an example, the linear polarizer 34 may be a wire grid polarizer. The transmission axis of the linear polarizer 34 may be fixed, and similarly to the linear polarizer 32, it is at the angle θ to the reference axis direction (in the present embodiment, as an example, −45 degrees to the X axis direction).

The linear polarizer 34 may be arranged so as to be tilted with respect to an optical axis between the half mirror 31 and the optical receiver 14, and in the present embodiment, as an example, it may be arranged at 45 degrees to the Y axis direction. Although details will be described later, depending on a polarization direction of light emitted from the half mirror 31 toward the optical receiver 14, the linear polarizer 34 may reflect and remove that light, or may transmit that light and cause it to enter the optical receiver 14.

(((Linear Polarizer 35)))

The linear polarizer 35 is an example of a first linear polarizer, may be arranged so as to face part of the reflection member 33 with the sample 100 interposed therebetween, and in the present embodiment, as an example, it may be arranged so as to face the roof mirror 330 (3) in the reflection member 33 with the flow cell 10 containing the sample 100 interposed therebetween. The linear polarizer 35 may be arranged so as to be orthogonal to an optical axis between the reflection member 33 and the linear polarizer 34. The linear polarizer 35 may be arranged apart from the flow cell 10, or may be arranged in contact with the flow cell 10.

The linear polarizer 35 may be a polarizer of the reflection type, and may have a transmission axis and a reflection axis. The transmission axis and the reflection axis of the linear polarizer 35 may intersect with each other, and in the present embodiment, as an example, they are orthogonal to each other. It should be noted that, in the present embodiment, as an example, the linear polarizer 35 may be a wire grid polarizer.

The linear polarizer 35 may receive the linearly polarized light transmitted through the sample 100, and in the present embodiment, as an example, it may receive light emitted from the reflection member 33 and transmitted through the sample 100. The linear polarizer 35 may transmit linearly polarized light with the transmission axis direction as its polarization direction out of that light and cause it to enter the linear polarizer 34, and may reflect linearly polarized light with a reflection axis direction as its polarization direction and cause it to be transmitted through the sample 100 and to enter the reflection member 33.

The linear polarizer 35 may be held by a holding member 350. The holding member 350 may hold the linear polarizer 35 such that the linear polarizer 35 can rotate while maintaining its orientation.

(((Switching Unit 36)))

The switching unit 36 controls a polarization direction of the linear polarizer 35, to switch between causing the linearly polarized light received by the linear polarizer 35 to be transmitted and reflected. As a result, the number of times that the light transmitted through the linear polarizer 35 is transmitted through the sample 100 before reaching the optical receiver 14 may be different from the number of times that the light reflected by the linear polarizer 35 is transmitted through the sample 100 before reaching the optical receiver 14.

The switching unit 36 may control the polarization direction by rotating the linear polarizer 35. The switching unit 36 may rotate the linear polarizer 35 via the holding member 350.

The switching unit 36 may orient the transmission axis of the linear polarizer 35 in a direction at an angle (−θ) (referred to as a first direction) to the reference axis direction (in the present embodiment, as an example, the X axis direction) and in a direction at the angle θ (referred to as a second direction) to the reference axis direction. In the present embodiment, as an example, the first direction may be at 45 degrees to the X axis direction, and the second direction may be at −45 degrees to the X axis direction.

((Action))

Subsequently, action of the optical system 3 according to the present embodiment will be described.

(((when Transmission Axis of Linear Polarizer 35 is Oriented in First Direction)))

FIG. 3 shows an optical path for a case where the transmission axis of the linear polarizer 35 is oriented in the first direction (that is, a direction at 45 degrees to the reference axis direction). When the transmission axis of the linear polarizer 35 is oriented in the first direction, part of unpolarized light $L_0$ emitted from the light source 11 is transmitted through the half mirror 31 and enters a linear polarizer 32$_{\_-45\ deg}$.

A linearly polarized component with a reflection axis direction of the linear polarizer 32$_{\_-45\ deg}$ (here, a direction at 45 degrees to the X axis direction) as its polarization direction out of the unpolarized light $L_0$ which has entered the linear polarizer 32$_{\_-45\ deg}$, is reflected by the linear polarizer 32$_{\_-45\ deg}$ to become linearly polarized light $L_{f1\_45\ deg}$, and enters the half mirror 31. Part of the light $L_{f1\_45\ deg}$ which has entered the half mirror 31 is reflected to become linearly polarized light $L_{f2\_45\ deg}$, then is further reflected by a linear polarizer 34$_{\_-45\ deg}$ to become light $L_{f3\_45\ deg}$, and is removed.

On the other hand, a linearly polarized component with a transmission axis direction of the linear polarizer 32$_{\_-45\ deg}$ (here, the direction at −45 degrees to the X axis direction) as its polarization direction out of the unpolarized light $L_0$ which has entered the linear polarizer 32$_{\_-45\ deg}$, is transmitted through the linear polarizer 32$_{\_-45\ deg}$ to become linearly polarized light $L_{e1\_-45\ deg}$, and is transmitted through the sample 100 and enters the roof mirror 330 (1). The linearly polarized light $L_{e1\_-45\ deg}$ which has entered the roof mirror 330 (1) becomes linearly polarized light $L_{e2\_45\ deg}$, $L_{e3\_-45\ deg}$, and $L_{e4\_45\ deg}$ as a result of its polarization direction being reversed in the Y axis direction each time reflected by the roof mirror 330 (1) to the roof mirror 330 (3), and is transmitted through the sample 100, and enters a linear polarizer 35$_{\_45\ deg}$. In this manner, in the present embodiment, the linearly polarized light with the direction at the angle θ (in the present embodiment, as an example, −45 degrees) to the reference axis direction as its polarization direction out of the light emitted from the light source 11 and transmitted through the half mirror 31, is transmitted through the linear polarizer 32$_{\_-45\ deg}$ and the sample 100 and is reflected by the reflection member 33, and becomes linearly polarized light with the first direction at the angle (−θ) (in the present embodiment, as an example, 45 degrees) to the reference axis direction, that is, a transmission axis direction of the linear polarizer 35$_{\_45\ deg}$ as its polarization direction and enters the linear polarizer 35. Therefore, the linearly polarized light $L_{e4\_45\ deg}$ emitted from the roof mirror 330 (3) and transmitted through the sample 100 is transmitted through the linear polarizer 35$_{\_45\ deg}$ and enters the linear polarizer 34$_{\_-45\ deg}$. Then, the linearly polarized light $L_{e4\_45\ deg}$ is reflected by the linear polarizer 34$_{\_-45\ deg}$ to become linearly polarized light $L_{e5\_45\ deg}$, and enters the optical receiver 14. In this manner, when the transmission axis of the linear polarizer 35 is oriented in the first direction, the light emitted from the light source 11 is transmitted through the sample 100 four times in total and enters the optical receiver 14.

(((when Transmission Axis of Linear Polarizer 35 is Oriented in Second Direction)))

Figure 4:
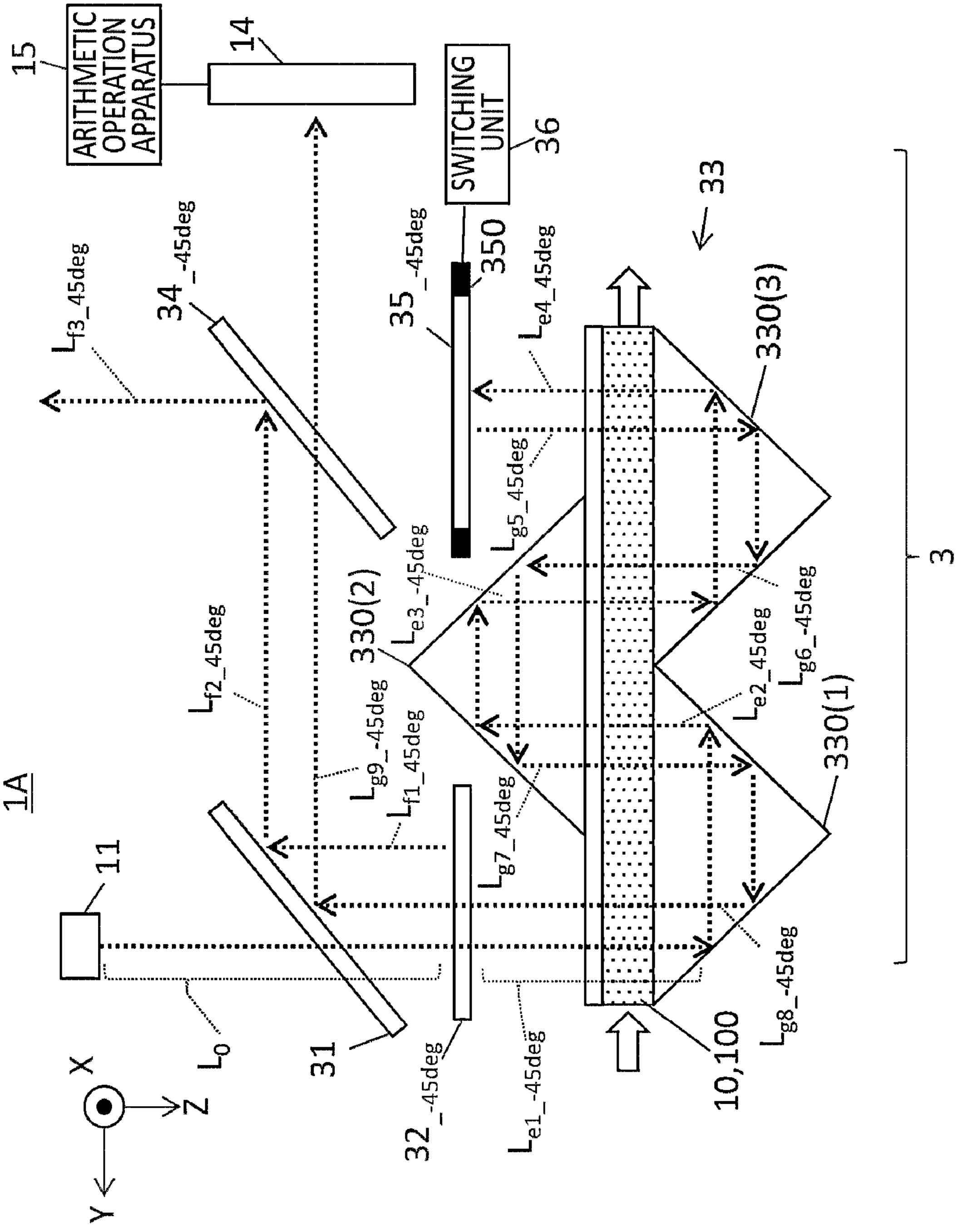
FIG. 4 shows an optical path for a case where a transmission axis of a linear polarizer 35 is oriented in a second direction.

FIG. 4 shows an optical path for a case where the transmission axis of the linear polarizer 35 is oriented in the second direction. When the transmission axis of the linear polarizer 35 is oriented in the second direction, part of the unpolarized light $L_0$ emitted from the light source 11 is transmitted through the half mirror 31 and enters the linear polarizer 32$_{\_-45\ deg}$.

The linearly polarized component with the reflection axis direction of the linear polarizer 32$_{\_-45\ deg}$ (here, the direction at 45 degrees to the X axis direction) as its polarization direction out of the unpolarized light $L_0$ which has entered the linear polarizer 32$_{\_-45\ deg}$, is, as described above, reflected in order by the linear polarizer 32$_{\_-45\ deg}$, the half mirror 31, and the linear polarizer 34$_{\_-45\ deg}$ to become linearly polarized light $L_{f1\_-45\ deg}$, $L_{f2\_-45\ deg}$, and $L_{r3\_45\ deg}$, and is removed.

On the other hand, the linearly polarized component with the transmission axis direction of the linear polarizer 32$_{\_-45\ deg}$ (here, the direction at −45 degrees to the X axis direction) as its polarization direction out of the unpolarized light $L_0$ which has entered the linear polarizer 32$_{\_-45\ deg}$, is, as described above, transmitted through the linear polarizer 32$_{\_-45\ deg}$ to become the linearly polarized light $L_{e1\_-45\ deg}$, is transmitted through the sample 100, then becomes the linearly polarized light $L_{e2\_45\ deg}$, $L_{e3\_-45\ deg}$, and $L_{e4\_45\ deg}$ as a result of its polarization direction being reversed in the Y axis direction each time reflected by the roof mirror 330 (1) to the roof mirror 330 (3), and is transmitted through the sample 100, and enters a linear polarizer 35$_{\_-45\ deg}$. Note that, when the transmission axis of the linear polarizer 35 is oriented in the second direction, the linearly polarized light $L_{e4\_45\ deg}$ entering the linear polarizer 35 has a reflection axis direction of the linear polarizer 35 as its polarization direction.

Therefore, the linearly polarized light $L_{e4\_45\ deg}$ which has entered the linear polarizer 35$_{\_-45\ deg}$ is reflected by the linear polarizer 35$_{\_45\ deg}$ to become linearly polarized light $L_{g5\_45\ deg}$, and is transmitted through the sample 100 and enters the roof mirror 330 (3). The linearly polarized light $L_{g5\_45\ deg}$ which has entered the roof mirror 330 (3) becomes linearly polarized light $L_{g6\_-45\ deg}$, $L_{g7\_45\ deg}$, and $L_{g8\_-45\ deg}$ as a result of its polarization direction being reversed in the Y axis direction each time reflected by the roof mirror 330 (3) to the roof mirror 330 (1), and is transmitted through the sample 100. The linearly polarized light $L_{g8\_-45\ deg}$ emitted from the roof mirror 330 (1) and transmitted through the sample 100 is transmitted through the linear polarizer $\mathbf{32}_{\_\_45\ deg}$ and enters the half mirror 31. Then, part of the linearly polarized light $L_{g8\text{-}45\ deg}$ which has entered the half mirror 31 is reflected to become linearly polarized light $L_{g9\_45\ deg}$, and then is transmitted through the linear polarizer $\mathbf{34}_{\_\_45\ deg}$ and enters the optical receiver 14. In this manner, when the transmission axis of the linear polarizer 35 is oriented in the second direction, the light emitted from the light source 11 is transmitted through the sample 100 eight times in total and enters the optical receiver 14. It should be noted that the movement described above is the same for a case where the angle θ is either 45 degrees or +135 degrees.

According to the optical measuring apparatus 1A described above, the polarization direction of the linear polarizer 35 is controlled, and switching is performed between causing the linearly polarized light received by the linear polarizer 35 to be transmitted and reflected. Then, the number of times that the light transmitted through the linear polarizer 35 is transmitted through the sample 100 before reaching the optical receiver 14 is different from the number of times that the light reflected by the linear polarizer 35 is transmitted through the sample 100 before reaching the optical receiver 14. Therefore, it is possible to switch a length of an optical path passing through the sample 100 by controlling the polarization direction of the linear polarizer 35. Therefore, unlike a case where a thickness of the flow cell 10 is changed to change a thickness of the sample 100, it is possible to switch the length of the optical path passing through the sample 100 while preventing a change in pressure applied to the sample 100.

In addition, the reflection member 33 is equipped with three roof mirrors 330 provided in order on the optical path, each of the first roof mirror 330 (1) and the second roof mirror 330 (2) returns the light transmitted through the sample 100 and causes it to be transmitted through that sample 100 and to enter the next roof mirrors 330 (2) and 330 (3) on the optical path, and the third roof mirror 330 (3) causes emitted light to be transmitted through the sample 100 and to enter the linear polarizer 35. Therefore, causing light to enter the first roof mirror 330 (1) via the sample 100 can cause that light to be transmitted through the sample 100 four times and to enter the linear polarizer 35.

In addition, since the linear polarizer 32 is arranged on the optical path between the light source 11 and the reflection member 33, it is possible to cause the linearly polarized light with the transmission axis direction of the linear polarizer 32 as its polarization direction out of the outgoing light from the light source 11 to enter the reflection member 33.

In addition, part of the outgoing light from the light source 11 is transmitted through the half mirror 31, enters the linear polarizer 32, and is guided to an optical path toward the linear polarizer 35, and the light reflected by the linear polarizer 35 is further reflected by the reflection member 33 and transmitted through the linear polarizer 32 toward the light source 11, and is reflected by the half mirror 31 toward the optical receiver 14. Therefore, it is possible to reliably cause the light transmitted through the sample 100 to enter the optical receiver 14.

In addition, the reflection member 33 maintains the polarization direction of the outgoing light in the reference axis direction while reversing it in one direction (a reverse direction) with respect to the polarization direction of the incident light, and the switching unit 36 rotates the linear polarizer 35, and orients the transmission axis of the linear polarizer 35 in the first direction at the angle (−θ) to the reference axis direction and in the second direction at the angle θ to the reference axis direction. In addition, transmission axes of the linear polarizer 32 which is arranged on the optical path between the light source 11 and the reflection member 33 and of the linear polarizer 34 of the reflection type which is arranged so as to be tilted on the optical path between the half mirror 31 and the optical receiver 14 and on the optical path between the linear polarizer 35 and the optical receiver 14 are each at the angle θ to the reference axis direction. Therefore, as a result of the transmission axis of the linear polarizer 35 being oriented in the first direction, the light emitted from the light source 11 can be transmitted through the sample 100 four times, and then enter the optical receiver 14. In addition, as a result of the transmission axis of the linear polarizer 35 being oriented in the second direction, the light emitted from the light source 11 can be transmitted through the sample 100 eight times, and then enter the optical receiver 14. Therefore, it is possible to switch the length of the optical path passing through the sample 100 by rotating the linear polarizer 35.

In addition, since the transmission axis and the reflection axis of the linear polarizer 35 as well as the transmission axis and the reflection axis of the linear polarizer 34 are orthogonal to each other, and the angle θ of the transmission axis with respect to the reference axis direction is either ±45 degrees or ±135 degrees, when the transmission axis of the linear polarizer 35 is oriented in the first direction, the linearly polarized light transmitted through the linear polarizer 32 and travelling from the reflection member 33 toward the linear polarizer 35 can reliably be transmitted through the linear polarizer 35 and reflected by the linear polarizer 34, and enter the optical receiver 14. In addition, when the transmission axis of the linear polarizer 35 is oriented in the second direction, the linearly polarized light transmitted through the linear polarizer 32 and travelling from the reflection member 33 toward the linear polarizer 35 can reliably be reflected by the linear polarizer 35, be transmitted through the sample 100 and further reflected by the reflection member 33, then be transmitted through the linear polarizer 32 and the linear polarizer 34, and enter the optical receiver 14.

Third Embodiment (Configuration of Optical Measuring Apparatus 1B)

Figure 5:
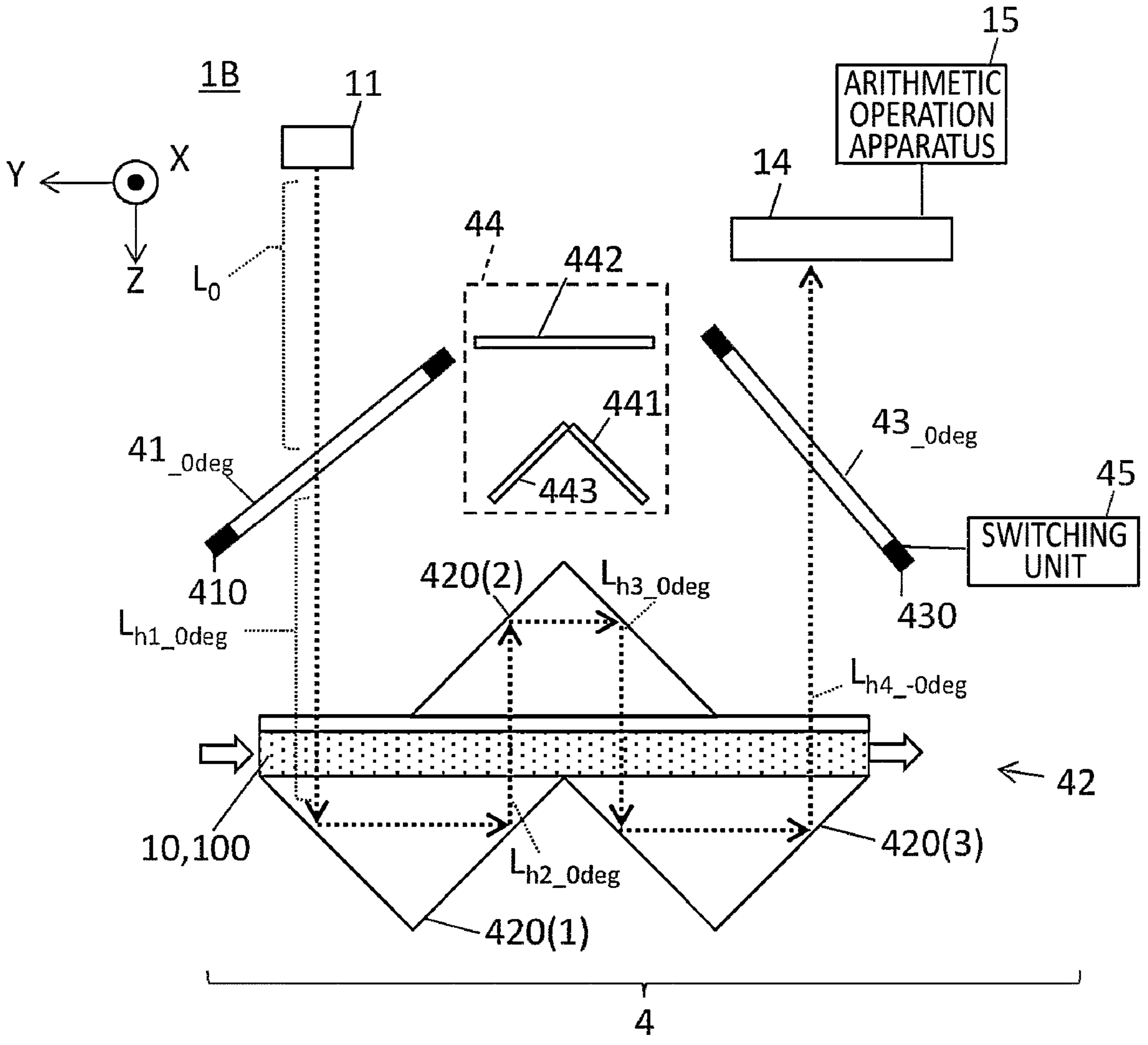
FIG. 5 shows an optical measuring apparatus 1B according to a third embodiment.

FIG. 5 shows an optical measuring apparatus 1B according to a third embodiment. The optical measuring apparatus 1B includes an optical system 4.

((Optical System 4))

The optical system 4 allows light from a light source 11 to pass through a sample 100, to guide the light to an optical receiver 14. The optical system 4 according to the present embodiment may cause the light to enter the sample 100 perpendicularly. The optical system 4 has a linear polarizer 41, a reflection member 42, a linear polarizer 43, an image rotator 44, and a switching unit 45. Among these, the linear polarizer 41 and part of the reflection member 42 are arranged side by side in the Z axis direction together with the light source 11, and another part of the reflection member 42 and the linear polarizer 43 are arranged side by side in the Z axis direction together with the optical receiver 14 so as to be parallel to the linear polarizer 41 and part of the reflection member 42. In addition, the linear polarizer 41, the image rotator 44, and the linear polarizer 43 are arranged side by side in the Y axis direction. The linear polarizers 41 and 43 may be arranged with their optical surfaces facing each other over a reference axis direction (in the present embodiment, as an example, the X axis direction) so as to have an internal angle of 90 degrees. The linear polarizers 41 and 43 may each be polarizers of a reflection type.

(((Linear Polarizer 41)))

The linear polarizer 41 is an example of a fifth linear polarizer, and is arranged on an optical path between the light source 11 and the reflection member 42. The linear polarizer 41 may be arranged so as to face part of the reflection member 42 with the sample 100 interposed therebetween, and in the present embodiment, as an example, it may be arranged so as to face a roof mirror 420 (1) (which will be described later) in the reflection member 42 with the flow cell 10 containing the sample 100 interposed therebetween. The linear polarizer 41 may be arranged so as to be tilted with respect to an optical axis between the light source 11 and the reflection member 42, and in the present embodiment, as an example, it may be arranged at 45 degrees to the Z axis direction.

The linear polarizer 41 may have a transmission axis and a reflection axis. The transmission axis and the reflection axis of the linear polarizer 41 may intersect with each other, and in the present embodiment, as an example, they are orthogonal to each other. It should be noted that, in the present embodiment, as an example, the linear polarizer 41 may be a wire grid polarizer.

The linear polarizer 41 may transmit linearly polarized light with a transmission axis direction of that linear polarizer 41 as its polarization direction out of the light emitted from the light source 11, and guide it to an optical path (also referred to as a reference optical path) leading from the reflection member 42 toward the linear polarizer 43 via the sample 100. The linear polarizer 41 may reflect and remove linearly polarized light with a reflection axis direction as its polarization direction out of the light emitted from the light source 11.

The linear polarizer 41 may receive the linearly polarized light transmitted through the sample 100, and in the present embodiment, as an example, it may receive light transmitted through the sample 100 and reflected by the linear polarizer 43. The linear polarizer 41 may further reflect the light reflected by the linear polarizer 43 and guide it to the reference optical path described above.

The linear polarizer 41 may be held by a holding member 410. The holding member 410 may hold the linear polarizer 41 such that the linear polarizer 41 can rotate while maintaining its orientation.

(((Reflection Member 42)))

The reflection member 42 reflects, in an opposite direction, the linearly polarized light transmitted through the sample 100 and entering the reflection member 42 and causes it to be further transmitted through the sample 100, and causes it to enter the linear polarizer 43. In the present embodiment, as an example, the reflection member 42 may receive light in the positive Z axis direction and reflect that light in the negative Z axis direction.

Similarly to the reflection member 33 in the second embodiment described above, the reflection member 42 may reverse a polarization direction of light emitted from that reflection member 42 in at least one direction orthogonal to an optical axis direction (in the present embodiment, as an example, the Z axis direction) with respect to a polarization direction of light entering that reflection member 42. For example, the reflection member 42 may reverse a polarization direction of outgoing light in one direction (in the present embodiment, as an example, the Y axis direction) orthogonal to the optical axis direction with respect to a polarization direction of incident light, and maintain it in a reference axis direction (in the present embodiment, as an example, the X axis direction) orthogonal to the optical axis direction and that one direction.

The reflection member 42 may have at least one roof mirror 420 which reflects the incident light two times and emits it in the opposite direction, and may have, for example, n roof mirrors 420 consisting of a first roof mirror 420 to an nth roof mirror 420 (where n is an odd number equal to or greater than 3) provided in order on the optical path. Among these, each of the first roof mirror 420 to the (n−1)th roof mirror 420 may return the light transmitted through the sample 100 and cause it to be transmitted through that sample 100 and to enter a next roof mirror 420 on the optical path, and the nth roof mirror 420 may cause emitted light to be transmitted through the sample 100 and to enter the linear polarizer 43. In the present embodiment, as an example, similarly to the reflection member 33 in the second embodiment described above, the reflection member 42 has a total of three roof mirrors 420 consisting of a first roof mirror 420 to a third roof mirror 420 (also referred to as the roof mirror 420 (1) to the roof mirror 420 (3)). Among these, the first roof mirror 420 (1) and the third roof mirror 420 (3) as odd-numbered roof mirrors may be arranged on a side opposite to the light source 11 with respect to the flow cell 10, and may face the linear polarizers 41 and 43 with the sample 100 interposed therebetween. The second roof mirror 420 (2) as an even-numbered roof mirror may be arranged on a side of the light source 11 with respect to the flow cell 10. Then, the light which has been emitted from the linear polarizer 41 and entered the first roof mirror 420 (1) may be emitted from the third roof mirror 420 (3) and enter the linear polarizer 43. Similarly to the roof mirror 230 in the first embodiment, each roof mirror 420 may be formed with its two reflection planes facing each other over the reference axis direction (in the present embodiment, as an example, the X axis direction) so as to have an internal angle of 90 degrees. Each roof mirror 420 may be arranged apart from the flow cell 10, may be arranged in contact with the flow cell 10, or may be part of a window member of the flow cell 10.

(((Linear Polarizer 43)))

The linear polarizer 43 is an example of a first linear polarizer, may be arranged so as to face part of the reflection member 42 with the sample 100 interposed therebetween, and in the present embodiment, as an example, it may be arranged so as to face the roof mirror 420 (3) in the reflection member 42 with the flow cell 10 containing the sample 100 interposed therebetween. The linear polarizer 43 may be arranged so as to be tilted with respect to an optical axis between the reflection member 42 and the optical receiver 14, and in the present embodiment, as an example, it may be arranged at −45 degrees to the Z axis direction.

The linear polarizer 43 may have a transmission axis and a reflection axis. The transmission axis and the reflection axis of the linear polarizer 43 may intersect with each other, and in the present embodiment, as an example, they are orthogonal to each other. It should be noted that, in the present embodiment, as an example, the linear polarizer 43 may be a wire grid polarizer.

The linear polarizer 43 may receive the linearly polarized light transmitted through the sample 100, and in the present embodiment, as an example, it may receive light emitted from the reflection member 42 and transmitted through the sample 100. The linear polarizer 43 may transmit linearly polarized light with a transmission axis direction as its polarization direction out of that light, and cause it to enter the optical receiver 14, and may reflect linearly polarized light with a reflection axis direction as its polarization direction, and cause it to enter the linear polarizer 41 via the image rotator 44.

The linear polarizer 43 may be held by a holding member 430. The holding member 430 may hold the linear polarizer 43 such that the linear polarizer 43 can rotate while maintaining its orientation.

(((Image Rotator 44)))

The image rotator 44 is arranged on an optical path between the linear polarizers 41 and 43. The image rotator 44 reverses a polarization direction of light emitted from that image rotator 44 in a direction (in the present embodiment, as an example, the Z axis direction) orthogonal to the optical axis direction (in the present embodiment, as an example, the Y axis direction) and the reference axis direction (in the present embodiment, as an example, the X axis direction) while maintaining it in the reference axis direction, with respect to a polarization direction of light entering that image rotator 44.

The image rotator 44 has two mirrors 441 and 443 which are respectively arranged so as to face the linear polarizers 43 and 41 as well as a mirror 442 which is arranged so as to face each of the mirrors 441 and 443. The mirrors 441 and 443 may be arranged to be symmetrical to each other with respect to the XZ plane, with opposite surfaces of their reflection surfaces facing each other over the reference axis direction (in the present embodiment, as an example, the X axis direction) so as to have an internal angle of 2$a$, where a is an angle between the Y axis direction and normals to the reflection surfaces. The mirror 441 may be arranged with its reflection surface facing toward the linear polarizer 43, and may reflect light entering that mirror 441 from the linear polarizer 43 and cause it to enter the mirror 442. The mirror 442 may be arranged so as to be orthogonal to the Z axis direction, and may reflect light entering that mirror 442 from the mirror 441 and cause it to enter the mirror 443. The mirror 443 may be arranged with its reflection surface facing toward the linear polarizer 41, and may reflect light entering that mirror 443 from the mirror 442 and cause it to enter the linear polarizer 41. It should be noted that the image rotator 44 may have another configuration, and for example, the image rotator 44 may have a dove prism instead of the mirrors 441 and 443.

(((Switching Unit 45)))

The switching unit 45 controls polarization directions of the linear polarizers 41 and 43, to respectively switch between causing the linearly polarized light received by the linear polarizers 41 and 43 to be transmitted and reflected. As a result, the number of times that the light transmitted through the linear polarizer 43 is transmitted through the sample 100 before reaching the optical receiver 14 may be different from the number of times that the light reflected by the linear polarizer 43 is transmitted through the sample 100 before reaching the optical receiver 14.

The switching unit 45 may control a polarization direction by rotating each of the linear polarizers 41 and 43 while maintaining its orientation. The switching unit 45 may rotate the linear polarizer 41 via the holding member 410, and may rotate the linear polarizer 43 via the holding member 430. It should be noted that, in FIG. 5, description of connection between the switching unit 45 and the holding member 410 is omitted for simplification of illustration.

The switching unit 45 may respectively orient the transmission axes of the linear polarizers 41 and 43 in a first direction parallel or perpendicular to the reference axis direction (in the present embodiment, as an example, the X axis direction) and in a second direction at the same angle to the reference axis direction and not parallel or perpendicular to the reference axis direction. The second direction may be at an angle of either ±45 degrees or ±135 degrees to the reference axis direction, and in the present embodiment, as an example, it is at −45 degrees thereto.

((Action))

Subsequently, action of the optical system 4 according to the present embodiment will be described.

(((when Transmission Axes of Linear Polarizers 41 and 43 are Oriented in First Direction)))

FIG. 5 shows an optical path for a case where the transmission axes of the linear polarizers 41 and 43 are oriented in the first direction. It should be noted that the present figure shows the first direction as a direction at 0 degrees to the X axis direction. When the transmission axes of the linear polarizers 41 and 43 are oriented in the first direction, unpolarized light $L_0$ emitted from the light source 11 enters a linear polarizer 41$_{\_0\ deg}$.

Although illustration is omitted, a linearly polarized component with a reflection axis direction of the linear polarizer 41$_{\_0\ deg}$ (here, a direction orthogonal to the X axis direction) as its polarization direction out of the unpolarized light $L_0$ which has entered the linear polarizer 41$_{\_0\ deg}$, is reflected and removed by the linear polarizer 41$_{\_0\ deg}$.

On the other hand, a linearly polarized component with a transmission axis direction of the linear polarizer 41$_{\_0\ deg}$ (here, the X axis direction) as its polarization direction out of the unpolarized light $L_0$ which has entered the linear polarizer 41$_{\_0\ deg}$, is transmitted through the linear polarizer 41$_{\_0\ deg}$ to become linearly polarized light $L_{h1\_0\ deg}$, and is transmitted through the sample 100 and enters the roof mirror 420 (1). The linearly polarized light $L_{h1\_0\ deg}$ which has entered the roof mirror 420 (1) becomes linearly polarized light $L_{h2\_0\ deg}$, $L_{h3\_0\ deg}$, and $L_{h4\_0\ deg}$ as a result of its polarization direction being reversed in the Y axis direction each time reflected by the roof mirrors 420 (1) to 420 (3), and is transmitted through the sample 100, and enters a linear polarizer 43$_{\_0\ deg}$. In this manner, in the present embodiment, the linearly polarized light $L_{h1\_0\ deg}$ with the first direction parallel to the reference axis direction as its polarization direction out of the light emitted from the light source 11 is transmitted through the linear polarizer 41$_{\_0\ deg}$ and the sample 100 and reflected by the reflection member 42, and becomes linearly polarized light $L_{h4\_0\ deg}$ with the first direction as its polarization direction and enters the linear polarizer 43. Therefore, the linearly polarized light $L_{h4\_0\ deg}$ which has entered the linear polarizer 43$_{\_0\ deg}$ is transmitted through the linear polarizer 43$_{\_0\ deg}$, and enters the optical receiver 14. Therefore, when the transmission axes of the linear polarizers 41 and 43 are oriented in the first direction, the light emitted from the light source 11 is transmitted through the sample 100 four times in total and enters the optical receiver 14. It should be noted that the movement described above is the same for a case where the transmission axes of the linear polarizer 41 and the linear polarizer 43 are at an angle of ±180 degrees, ±90 degrees, or ±270 degrees to the reference axis direction.

(((when Transmission Axes of Linear Polarizers 41 and 43 are Oriented in Second Direction)))

Figure 6:
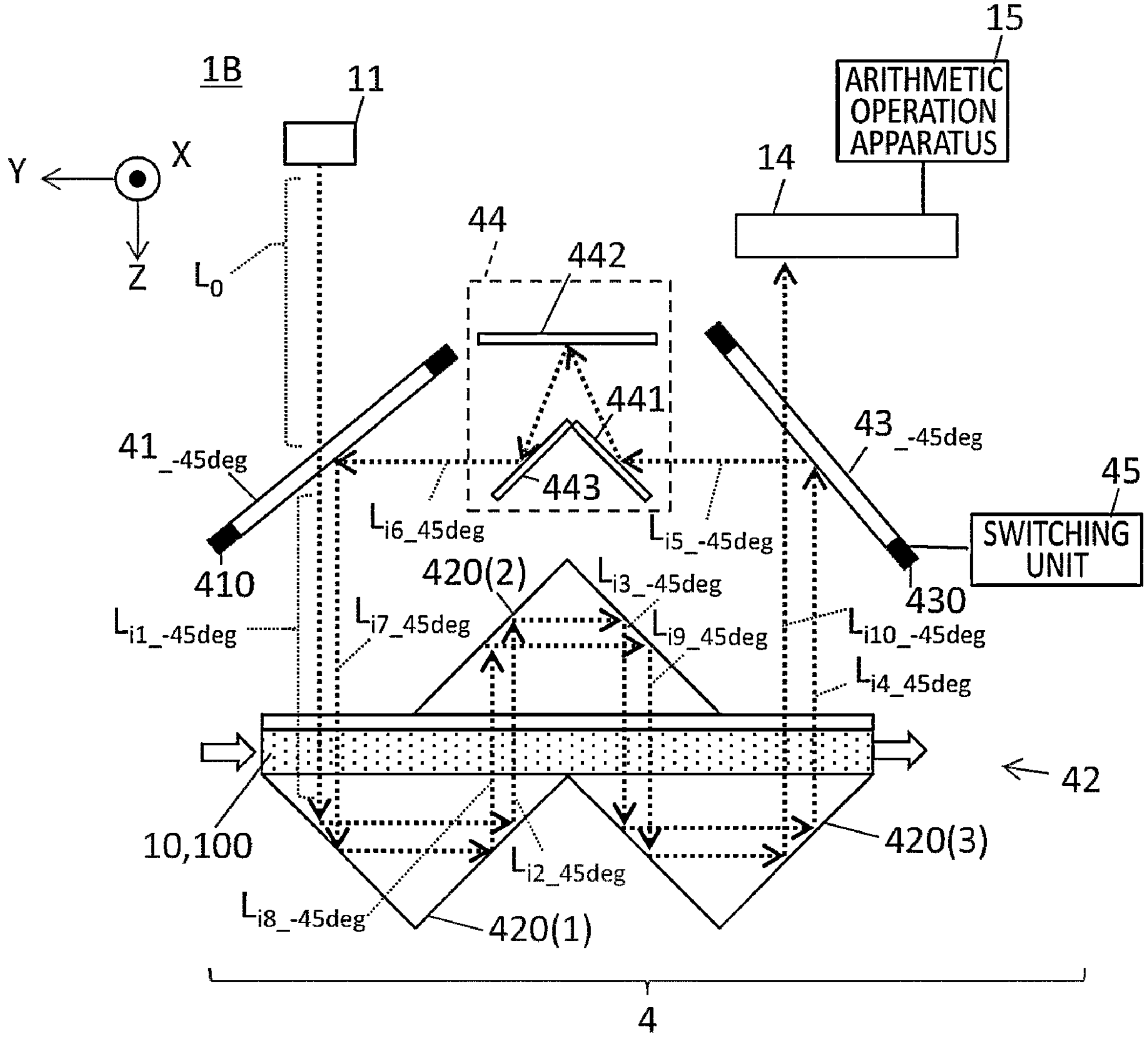
FIG. 6 shows an optical path for a case where transmission axes of linear polarizers 41 and 43 are oriented in a second direction.

FIG. 6 shows an optical path for a case where the transmission axes of the linear polarizers 41 and 43 are oriented in the second direction. When the transmission axes of the linear polarizers 41 and 43 are oriented in the second direction, the unpolarized light $L_0$ emitted from the light source 11 enters a linear polarizer $\mathbf{41}_{\_-45\ deg}$.

Although illustration is omitted, a linearly polarized component with a reflection axis direction of the linear polarizer $\mathbf{41}_{\_-45\ deg}$ (here, a direction at 45 degrees to the X axis direction) as its polarization direction out of the unpolarized light $L_0$ which has entered the linear polarizer $\mathbf{41}_{\_-45\ deg}$, is reflected and removed by the linear polarizer $\mathbf{41}_{\_-45\ deg}$.

On the other hand, the linearly polarized component with the transmission axis direction of the linear polarizer $\mathbf{41}_{\_-45\ deg}$ (here, a direction at −45 degrees to the X axis direction) as its polarization direction out of the unpolarized light $L_0$ which has entered the linear polarizer $\mathbf{41}_{\_-45\ deg}$, is transmitted through the linear polarizer $\mathbf{41}_{\_-45\ deg}$ to become linearly polarized light $L_{i1\_-45\ deg}$, is transmitted through the sample 100, then becomes linearly polarized light $L_{i2\_45\ deg}$, $L_{i3\_-45\ deg}$, and $L_{i4\_45\ deg}$ as a result of its polarization direction being reversed in the Y axis direction each time reflected by the roof mirrors 420 (1) to 420 (3), and is transmitted through the sample 100, and enters a linear polarizer $\mathbf{43}_{\_-45\ deg}$. In the present embodiment, an optical path leading from the linear polarizer 41 to the linear polarizer 43 may be the reference optical path. Here, the linearly polarized light $L_{i4\_45\ deg}$ has a reflection axis direction of the linear polarizer $\mathbf{43}_{\_-45\ deg}$ as its polarization direction.

Therefore, the linearly polarized light $L_{i4\_45\ deg}$ which has entered the linear polarizer $\mathbf{43}_{\_-45\ deg}$ is reflected by the linear polarizer $\mathbf{43}_{\_45\ deg}$ to become linearly polarized light $L_{i5\_-45\ deg}$, and enters the image rotator 44.

The linearly polarized light $L_{i5\_-45\ deg}$ which has entered the image rotator 44 becomes linearly polarized light $L_{i6\_45\ deg}$ as a result of its polarization direction being reversed in the Z axis direction, and is emitted from the image rotator 44, and enters the linear polarizer $\mathbf{41}_{\_-45\ deg}$. Here, the linearly polarized light $L_{i6\_45\ deg}$ has the reflection axis direction of the linear polarizer $\mathbf{41}_{\_-45\ deg}$ as its polarization direction.

Therefore, the linearly polarized light $L_{i6\_45\ deg}$ which has entered the linear polarizer $\mathbf{41}_{\_-45\ deg}$ is reflected by the linear polarizer $\mathbf{41}_{\_45\ deg}$ to become linearly polarized light $L_{i7\_45\ deg}$, is transmitted through the sample 100, then becomes linearly polarized light $L_{i8\_-45\ deg}$, $L_{i9\_45\ deg}$, and $L_{i10\_-45\ deg}$ as a result of its polarization direction being reversed in the Y axis direction each time reflected by the roof mirrors 420 (1) to 420 (3), and is transmitted through the sample 100, and enters the linear polarizer $\mathbf{43}_{\_-45\ deg}$. That is, light emitted from the linear polarizer $\mathbf{41}_{\_-45\ deg}$ is guided again to the reference optical path leading from the linear polarizer 41 to the linear polarizer 43. Here, the linearly polarized light $L_{i10\text{-}45\ deg}$ has a transmission axis direction of the linear polarizer $\mathbf{43}_{\_-45\ deg}$ as its polarization direction.

Therefore, the linearly polarized light $L_{i10\_-45\ deg}$ which has entered the linear polarizer $\mathbf{43}_{\_-45\ deg}$ is transmitted through the linear polarizer $\mathbf{43}_{\_-45\ deg}$, and enters the optical receiver 14. In this manner, when the transmission axes of the linear polarizers 41 and 43 are oriented in the second direction, the light emitted from the light source 11 is transmitted through the sample 100 eight times in total and enters the optical receiver 14. It should be noted that the movement described above is the same for a case where the transmission axes of the linear polarizer 41 and the linear polarizer 43 are at an angle of 45 degrees, 135 degrees, or −135 degrees to the reference axis direction.

(((Polarization Directions of Light $L_{i4}$ to $L_{i7}$)))

Figure 7:
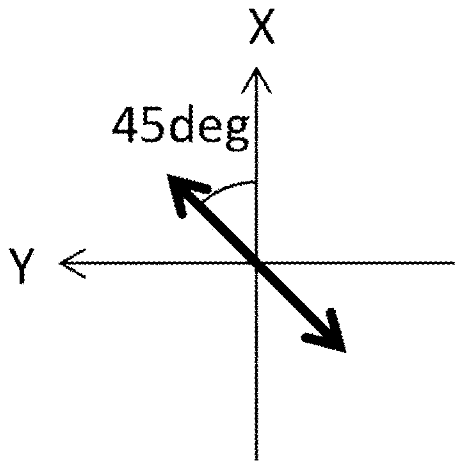
FIG. 7 shows a polarization direction of light $L_{i4\_45\ deg}$.

FIG. 7 shows a polarization direction of the light $L_{i4\_45\ deg}$. The polarization direction of the light $L_{i4\_45\ deg}$ may be at 45 degrees to the X axis direction (that is, the reference axis direction) in the XY coordinate system. It should be noted that, in the figure, the polarization direction is indicated by a thick arrow. In addition, an angle of the polarization direction with respect to the X axis direction may be a positive angle in first and third quadrants, and a negative angle in second and fourth quadrants in a coordinate plane.

Figure 8:
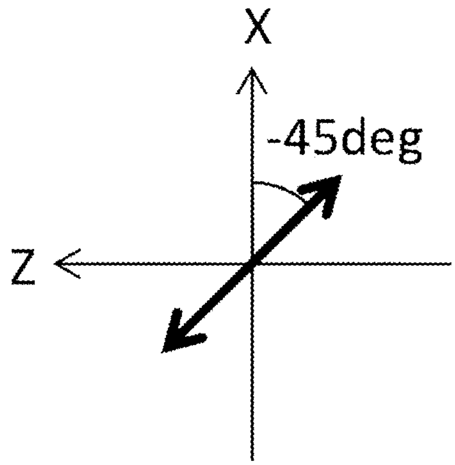
FIG. 8 shows a polarization direction of light $L_{i5\_-45\ deg}$.

FIG. 8 shows a polarization direction of the light $L_{i5\_-45\ deg}$. The polarization direction of the light $L_{i5\_-45\ deg}$ may be at −45 degrees to the X axis direction in the XZ coordinate system.

Figure 9:
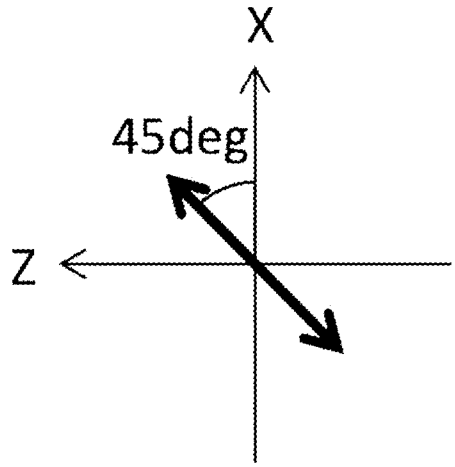
FIG. 9 shows a polarization direction of light $L_{i6\_45\ deg}$.

FIG. 9 shows a polarization direction of the light $L_{i6\_45\ deg}$. The polarization direction of the light $L_{i6\_45\ deg}$ may be at 45 degrees to the X axis direction in the XZ coordinate system.

Figure 10:
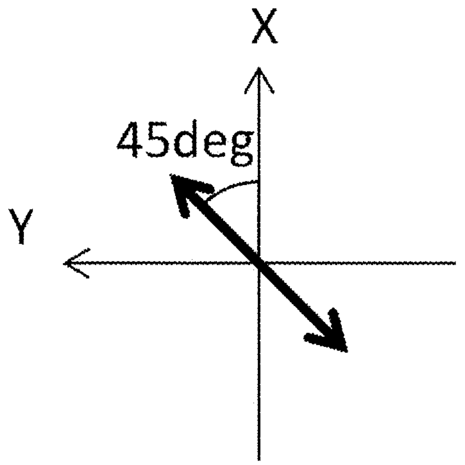
FIG. 10 shows a polarization direction of light Li7_45 deg.

FIG. 10 shows a polarization direction of the light $L_{i7\_45\ deg}$. The polarization direction of the light $L_{i7\_45\ deg}$ may be at 45 degrees to the X axis direction in the XY coordinate system.

According to the optical measuring apparatus 1B described above, the polarization direction of the linear polarizer 43 is controlled, and switching is performed between causing the linearly polarized light received by the linear polarizer 43 to be transmitted and reflected. Then, the number of times that the light transmitted through the linear polarizer 43 is transmitted through the sample 100 before reaching the optical receiver 14 is different from the number of times that the light reflected by the linear polarizer 43 is transmitted through the sample 100 before reaching the optical receiver 14. Therefore, it is possible to switch a length of an optical path passing through the sample 100 by controlling the polarization direction of the linear polarizer 43. Therefore, unlike a case where a thickness of the flow cell 10 is changed to change a thickness of the sample 100, it is possible to switch the length of the optical path passing through the sample 100 while preventing a change in pressure applied to the sample 100.

In addition, the linear polarizer 41 transmits linearly polarized light with the transmission axis direction of the linear polarizer 41 as its polarization direction out of outgoing light from the light source 11 and guides it to the reference optical path leading from the reflection member 42 toward the linear polarizer 43 via the sample 100, and reflects the light reflected by the linear polarizer 43 and guides it to that reference optical path. In addition, the reflection member 42 reverses the polarization direction of the light emitted from that reflection member 42 in one direction orthogonal to the optical axis direction with respect to the polarization direction of the light entering that reflection member 42, and maintains it in the reference axis direction orthogonal to the optical axis direction and that one direction. In addition, the switching unit 45 rotates each of the linear polarizers 41 and 43, and respectively orients the transmission axes of the linear polarizers 41 and 43 in the first direction parallel or perpendicular to the reference axis direction and in the second direction at the same angle to the reference axis direction. Therefore, as a result of the transmission axes of the linear polarizers 41 and 43 being oriented in the first direction, the light emitted from the light source 11 can be transmitted through the sample 100 four times, and then enter the optical receiver 14. In addition, as a result of the transmission axes of the linear polarizers 41 and 43 being oriented in the second direction, the light emitted from the light source 11 can be transmitted through the sample 100 eight times, and then enter the optical receiver 14. Therefore, it is possible to switch the length of the optical path passing through the sample 100 by rotating the linear polarizers 41 and 43.

In addition, since the transmission axis and the reflection axis of the linear polarizer 43 as well as the transmission axis and the reflection axis of the linear polarizer 41 are orthogonal to each other, and the second direction is at an angle of either ±45 degrees or ±135 degrees to the reference axis direction, as a result of the transmission axes of the linear polarizers 41 and 43 being oriented in the second direction, the linearly polarized light transmitted through the linear polarizer 41 and travelling from the reflection member 42 toward the linear polarizer 43 can reliably be reflected by the linear polarizers 41 and 43 and guided again to the reference optical path, then be transmitted through the linear polarizer 43, and enter the optical receiver 14.

In addition, the linear polarizers 41 and 43 are arranged with their optical surfaces facing each other over the reference axis direction so as to have an internal angle of 90 degrees, and the image rotator 44 arranged on the optical path between the linear polarizers 41 and 43 reverses the polarization direction of the outgoing light in a direction orthogonal to the optical axis direction and the reference axis direction while maintaining it in the reference axis direction, with respect to the polarization direction of the incident light. Therefore, the polarization direction of the light entering the linear polarizer 41 from the linear polarizer 43 can be reversed, and be reliably reflected from the linear polarizer 41 toward the reflection member 42.

Modification Example

It should be noted that, in the first to third embodiments described above, although the optical measuring apparatus 1, 1A, and 1B have been described as including the flow cell 10, they may not include the flow cell 10. In addition, although the sample 100 has been described as being a fluid, it may be a translucent solid.

In addition, although the light source 11 has been described as emitting nonpolarized light, it may emit linearly polarized light. For example, the light source 11 may emit light with the transmission axis directions of the linear polarizers 22, 32, and 41 as its polarization direction.

In addition, although the reflection member 23 has been described as having a single roof mirror 230, it may have a plurality of roof mirrors 230. For example, similarly to the reflection members 33 and 42, the reflection member 23 may have n roof mirrors 330 consisting of a first roof mirror 330 to an nth roof mirror 330 (where n is an odd number equal to or greater than 3) provided in order on the optical path. In this case, each of the first roof mirror 230 to the (n−1)th roof mirror 230 may return the light transmitted through the sample 100 and cause it to be transmitted through that sample 100 and to enter a next roof mirror 230 on the optical path, and the nth roof mirror 230 may cause emitted light to be transmitted through the sample 100 and to enter the linear polarizer 22.

In addition, although the reflection members 33 and 42 have been described as having three or more odd number of roof mirrors 330 and 420, they may have single roof mirrors 330 and 420, similarly to the reflection member 23.

In addition, although the reflection members 23, 33, and 42 have been described as reversing the polarization direction of the outgoing light in one direction (as an example, the Y axis direction) orthogonal to the optical axis direction with respect to the polarization direction of the incident light, they may each reverse it in a plurality of directions orthogonal to the optical axis direction. For example, the reflection member 33 may have a plurality of roof mirrors 330, and at least two roof mirrors 330 of these roof mirrors may be formed with their respective two reflection planes facing each other over different directions orthogonal to the optical axis direction. The same applies to the reflection members 23 and 42.

In addition, although the linear polarizers 24 and 32 have been described as being polarizers of a reflection type, they may be polarizers of an absorption type. In this case, the transmission axis and the absorption axis may orthogonal to each other.

While the present invention has been described with the embodiments, the technical scope of the present invention is not limited to the above embodiments. It is apparent to persons skilled in the art that various alterations and improvements can be added to the above-described embodiments. It is also apparent from description of the claims that the embodiments to which such alterations or improvements are made can be included in the technical scope of the present invention.

It should be noted that the operations, procedures, steps, stages, and the like of each process performed by an apparatus, system, program, and method shown in the claims, embodiments, or diagrams can be realized in any order as long as the order is not indicated by "prior to," "before," or the like and as long as the output from a previous process is not used in a later process. Even if the operation flow is described using phrases such as "first" or "next" for the sake of convenience in the claims, specification, or drawings, it does not necessarily mean that the process must be performed in this order.

EXPLANATION OF REFERENCES

1, 1A, and 1B: optical measuring apparatus
2 to 4: optical system
10: flow cell
11: light source
14: optical receiver
15: arithmetic operation apparatus
21: half mirror
22: linear polarizer
23: reflection member
24: linear polarizer
25: switching unit
31: half mirror
32: linear polarizer
33: reflection member
34: linear polarizer
35: linear polarizer
36: switching unit
41: linear polarizer
42: reflection member
43: linear polarizer
44: image rotator
45: switching unit
100: sample
220: holding member
230: roof mirror
240: holding member
330: roof mirror
350: holding member
410: holding member
420: roof mirror
430: holding member
441: mirror

442: mirror
443: mirror.

What is claimed is:

1. An optical system comprising:
at least one roof mirror for twice reflecting linearly polarized light transmitted through a sample, back through the sample;
a first linear polarizer of a reflection type which receives the reflected linearly polarized light reflected back through a sample; and
a switching unit which controls a polarization direction of the first linear polarizer, to switch between causing the reflected linearly polarized light received by the first linear polarizer after being reflected back through the sample to be reflected, wherein
a quantity of times that light transmitted through the first linear polarizer is transmitted through the sample before reaching an optical receiver is different from a quantity of times that light reflected by the first linear polarizer is transmitted through the sample before reaching the optical receiver.

2. The optical system according to claim 1
wherein
the at least one roof mirror reverses a polarization direction of light emitted from the at least one roof mirror in at least one direction orthogonal to an optical axis direction with respect to a polarization direction of light entering the at least one roof mirror.

3. The optical system according to claim 2, wherein the at least one roof mirror has at least one roof mirror which reflects incident light two times and emits it in an opposite direction.

4. The optical system according to claim 3, wherein
the at least one roof mirror includes n roof mirrors consisting of a first roof mirror to an nth roof mirror (where n is an odd number equal to or greater than 3) provided in order on an optical path,
each of the first roof mirror to the (n−1)th roof mirror of the n roof mirrors returns light transmitted through the sample and causes it to be transmitted through the sample and to enter a next roof mirror on an optical path, and
the nth roof mirror of the n roof mirrors causes emitted light to be transmitted through the sample and to enter the first linear polarizer.

5. The optical system according to claim 2, wherein
the first linear polarizer is arranged so as to face the at least one roof mirror with the sample interposed therebetween,
the first linear polarizer transmits linearly polarized light with a transmission axis direction of the first linear polarizer as its polarization direction out of light emitted from a light source, and causes it to be transmitted through the sample and to enter the at least one roof mirror, and
the first linear polarizer receives light reflected by the at least one roof mirror and transmitted through the sample.

6. The optical system according to claim 5, wherein
a transmission axis and a reflection axis of the first linear polarizer are orthogonal to each other,
the at least one roof mirror reverses a polarization direction of light emitted from the at least one roof mirror in one direction orthogonal to an optical axis direction with respect to a polarization direction of light entering the at least one roof mirror, and maintains it in a reference axis direction orthogonal to an optical axis direction and the one direction, and
the switching unit rotates the first linear polarizer while maintaining its orientation and orients the transmission axis in a direction orthogonal to the reference axis direction and in a direction at an angle of either ±45 degrees or ±135 degrees to the reference axis direction.

7. The optical system according to claim 6, comprising:
a half mirror which transmits part of light emitted from the light source and causes it to enter the first linear polarizer and which reflects, toward the optical receiver, part of light travelling from the first linear polarizer toward the light source; and
a second linear polarizer which is arranged on an optical path between the half mirror and the optical receiver, wherein
the switching unit rotates the second linear polarizer while maintaining its orientation, and matches an angle at which a transmission axis of the second linear polarizer is to the reference axis direction with an angle at which a transmission axis of the first linear polarizer is to the reference axis direction.

8. The optical system according to claim 2, further comprising a third linear polarizer which is arranged on an optical path between a light source and the at least one roof mirror.

9. The optical system according to claim 8, further comprising a half mirror which transmits part of light emitted from the light source and causes it to enter the third linear polarizer and which reflects, toward the optical receiver, part of light travelling from the third linear polarizer toward the light source, wherein
the third linear polarizer transmits linearly polarized light which is reflected by the first linear polarizer and transmitted through the sample and which is further reflected by the at least one roof mirror and transmitted through the sample.

10. The optical system according to claim 9, further comprising a fourth linear polarizer of the reflection type which is arranged on an optical path between the half mirror and the optical receiver and on an optical path between the first linear polarizer and the optical receiver, wherein
the at least one roof mirror reverses a polarization direction of light emitted from the at least one roof mirror in one direction orthogonal to an optical axis direction with respect to a polarization direction of light entering the at least one roof mirror, and maintains it in a reference axis direction orthogonal to an optical axis direction and the one direction,
transmission axes of the third linear polarizer and the fourth linear polarizer are at an angle θ, which is an angle other than ±90 degrees, to the reference axis direction, and
the switching unit rotates the first linear polarizer while maintaining its orientation, and orients a transmission axis of the first linear polarizer in a direction at an angle (−θ) to the reference axis direction and in a direction at the angle θ to the reference axis direction.

11. The optical system according to claim 10, wherein
a transmission axis and a reflection axis of the first linear polarizer as well as a transmission axis and a reflection axis of the fourth linear polarizer are orthogonal to each other, and
an angle θ is either ±45 degrees or ±135 degrees.

12. The optical system according to claim 2, further comprising a fifth linear polarizer of the reflection type which transmits linearly polarized light with a transmission axis direction as its polarization direction out of light emitted from a light source and guides it to an optical path leading from the at least one roof mirror toward the first linear polarizer via the sample, and which reflects light reflected by the first linear polarizer and guides it to the optical path, wherein the at least one roof mirror reverses a polarization direction of light emitted from the at least one roof mirror in one direction orthogonal to an optical axis direction with respect to a polarization direction of light entering the at least one roof mirror, and maintains it in a reference axis direction orthogonal to an optical axis direction and the one direction, and the switching unit rotates each of the first linear polarizer and the fifth linear polarizer while maintaining its orientation, and respectively orients transmission axes of the first linear polarizer and the fifth linear polarizer in a first direction parallel or perpendicular to the reference axis direction and in a second direction at a same angle to the reference axis direction and not parallel or perpendicular the reference axis direction.

13. The optical system according to claim 12, wherein a transmission axis and a reflection axis of the first linear polarizer as well as a transmission axis and a reflection axis of the fifth linear polarizer are orthogonal to each other, and the second direction is at an angle of either ±45 degrees or ±135 degrees to the reference axis direction.

14. The optical system according to claim 13, wherein the first linear polarizer and the fifth linear polarizer are arranged with their optical surfaces facing each other over the reference axis direction so as to have an internal angle of 90 degrees, the optical system further includes an image rotator which is arranged on an optical path between the first linear polarizer and the fifth linear polarizer, and the image rotator reverses a polarization direction of light emitted from the image rotator in a direction orthogonal to an optical axis direction and the reference axis direction while maintaining it in the reference axis direction, with respect to a polarization direction of light entering the image rotator.

15. The optical system according to claim 1, wherein light is caused to enter the sample perpendicularly.

16. The optical system according to claim 1, wherein the first linear polarizer is a wire grid polarizer.

17. An optical measuring apparatus comprising:

the optical system according to claim 1;

a light source which emits light to the optical system; and an optical receiver which receives light emitted from the optical system.

18. The optical measuring apparatus according to claim 17, wherein the sample is a fluid flowing in a translucent flow cell.

* * * * *